United States Patent [19]
Yamamoto

[11] Patent Number: 6,047,137
[45] Date of Patent: Apr. 4, 2000

[54] CAMERA

[75] Inventor: Yuji Yamamoto, Kasukabe, Japan

[73] Assignee: Canon Kabushiki Kaisha, Tokyo, Japan

[21] Appl. No.: 09/273,376

[22] Filed: Mar. 22, 1999

[30] Foreign Application Priority Data

Mar. 31, 1998 [JP] Japan ................................. 10-086746
Mar. 31, 1998 [JP] Japan ................................. 10-086747

[51] Int. Cl.$^7$ ................................................. G03B 15/05
[52] U.S. Cl. ........................ 396/157; 396/159; 396/206; 396/266
[58] Field of Search .................................... 396/157, 159, 396/155, 266, 222, 167, 205, 206

[56] References Cited

U.S. PATENT DOCUMENTS 5,708,873  1/1998  Kobayashi ............................. 396/159

*Primary Examiner*—W. B. Perkey
*Attorney, Agent, or Firm*—Robin, Blecker & Daley

[57] ABSTRACT

In a camera capable of setting a flash bracketing photo-taking mode in which an amount of light emission by a flash device is increased or decreased by a desired amount with respect to a predetermined value for every shot to be taken using the flash device, a photo-taking operation of the camera is inhibited if a charge voltage of the flash device is lower than a predetermined voltage when the camera is set in the flash bracketing photo-taking mode. Further, in a camera capable of performing an FE lock function of setting an amount of light emission of a flash device for a photo-taking operation by making preliminary light emission from the flash device prior to the photo-taking operation, and capable of setting a flash bracketing photo-taking mode in which an amount of light emission by the flash device is increased or decreased by a desired amount with respect to a predetermined value for every shot to be taken using the flash device, information related to the FE lock function (information such as the amount of main light emission) is retained even if a charge voltage of the flash device is lower than a light emission enabling voltage when the FE lock function has been performed with the camera set in the flash bracketing photo-taking mode.

19 Claims, 14 Drawing Sheets

CAMERA

BACKGROUND OF THE INVENTION

1. Field of the Invention

The present invention relates to a camera capable of performing a flash bracketing photo-taking operation.

2. Description of Related Art

The flash bracketing function is a function of increasing or decreasing the amount of flash light emission by a desired amount with respect to a predetermined (apposite) amount of flash light emission, for each shot to be taken by flash photography. In the meantime, some of known cameras are arranged such that, in carrying out flash photography, if the actual charge voltage of a flash device is lower than a minimum voltage at which flash light emission is possible (hereinafter referred to as a light emission enabling voltage), a photo-taking operation is carried out using only external available light without using the flash device when a shutter release operation is performed. In the case of a camera arranged to perform a photo-taking operation without using a flash device (hereinafter referred to as non-flash photo-taking) when a charge voltage of the flash device drops to a level lower than the light emission enabling voltage while the flash bracketing photo-taking is in process, the photo-taking operation is carried out using only external light without using the flash device.

In the event of such a non-flash photo-taking operation in the flash bracketing photo-taking operation, the continuity of the amount of flash exposure would be lost before completion of one sequence of flash bracketing, assuming that one sequence of flash bracketing consists of, for example, three shots.

Meanwhile, some cameras have an FE lock function. The FE lock function is a function of establishing a basic light emitting amount (the amount of main light emission) of a flash device in the case of photo-taking with a preliminary light emission from the flash device before commencement of a sequence of photo-taking actions. It has been practiced to use the FE lock function and the flash bracketing function separately from each other.

According to the conventional arrangement of the FE lock function, when the charge voltage of the flash device becomes lower than the light emission enabling voltage, it is impossible to carry out flash photography. Therefore, in that event, it has been practiced to cancel the FE lock function by clearing information related to the FE lock function (FE lock information).

However, in a case where both the FE lock function and the flash bracketing function are used at a time, if the FE lock information is cleared when the charge voltage of the flash device becomes lower than the light emission enabling voltage, the process of flash bracketing in the state of FE lock tends to come to an end before its completion.

Further, if the flash bracketing process is allowed to continue after updating the information related to the FE lock function during the flash bracketing process, the continuity of the amount of flash exposure for one sequence of flash bracketing would be lost.

BRIEF SUMMARY OF THE INVENTION

It is one object of the invention to provide a camera which is capable of preventing the continuity of the amount of flash exposure from being lost when a non-flash photo-taking operation is caused to be performed due to insufficiency of the charge voltage of a flash device while a flash bracketing function is used for photo-taking.

To attain the above object, in accordance with one aspect of the invention, there is provided a camera capable of setting a flash bracketing photo-taking mode in which an amount of light emission by a flash device is increased or decreased by a desired amount with respect to a predetermined value for every shot to be taken using the flash device, the camera comprising control means for inhibiting a photo-taking operation of the camera if a charge voltage of the flash device is lower than a predetermined voltage when the camera is set in the flash bracketing photo-taking mode.

It is another object of the invention to provide a camera arranged to be capable of preventing a flash bracketing process from being terminated halfway before its completion under an FE lock condition by an action performed to clear information related to the FE lock when the charge voltage of a flash device becomes lower than a light emission enabling voltage.

To attain the above object, in accordance with another aspect of the invention, there is provided a camera capable of performing an FE lock function of setting an amount of light emission of a flash device for a photo-taking operation by making preliminary light emission from the flash device prior to the photo-taking operation, and capable of setting a flash bracketing photo-taking mode in which an amount of light emission by the flash device is increased or decreased by a desired amount with respect to a predetermined value for every shot to be taken using flash device, the camera comprising control means for retaining information related to the FE lock function (information such as the amount of main light emission) even if a charge voltage of the flash device is lower than a light emission enabling voltage when the FE lock function has been performed with the camera set in the flash bracketing photo-taking mode.

These and other objects and features of the invention will become apparent from the following detailed description of preferred embodiments thereof taking in connection with the accompanying drawings.

DETAILED DESCRIPTION OF THE INVENTION

Hereinafter, preferred embodiments of the invention will be described in detail with reference to the drawings.
(First Embodiment)

Figure 1:
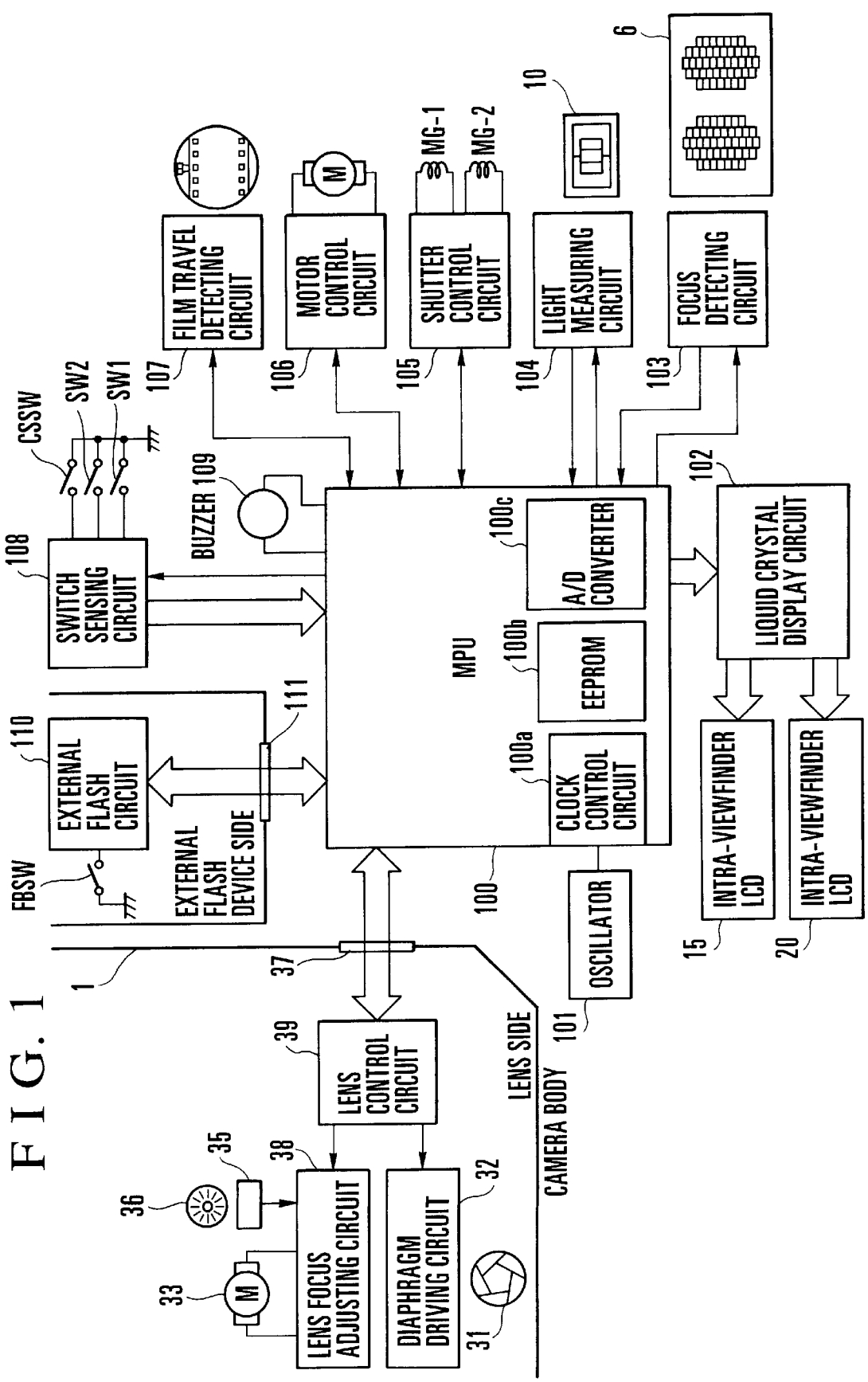
FIG. 1 is a block diagram showing essential parts of the electrical arrangement incorporated in a single-lens reflex camera according to a first embodiment of the invention.

FIG. 1 shows the electrical arrangement of a single-lens reflex camera having a flash bracketing function according to a first embodiment of the invention. In FIG. 1, reference numeral 100 denotes a central processing unit which is a microcomputer disposed within the body of the camera as control means (hereinafter referred to as MPU). The operating frequency of the MPU 100 is determined by not dividing or dividing into ½ or into ¹⁄₁₆ an original oscillation frequency generated by an oscillator 101.

An EEPROM 100b is arranged as storage means to be capable of storing photo-taking information such as a film frame number, FE lock information, flash bracketing information, etc. An A/D converter 100c is arranged to convert analog signals coming from a focus detecting circuit 103 and a light measuring circuit 104 into digital signals.

Figure 2:
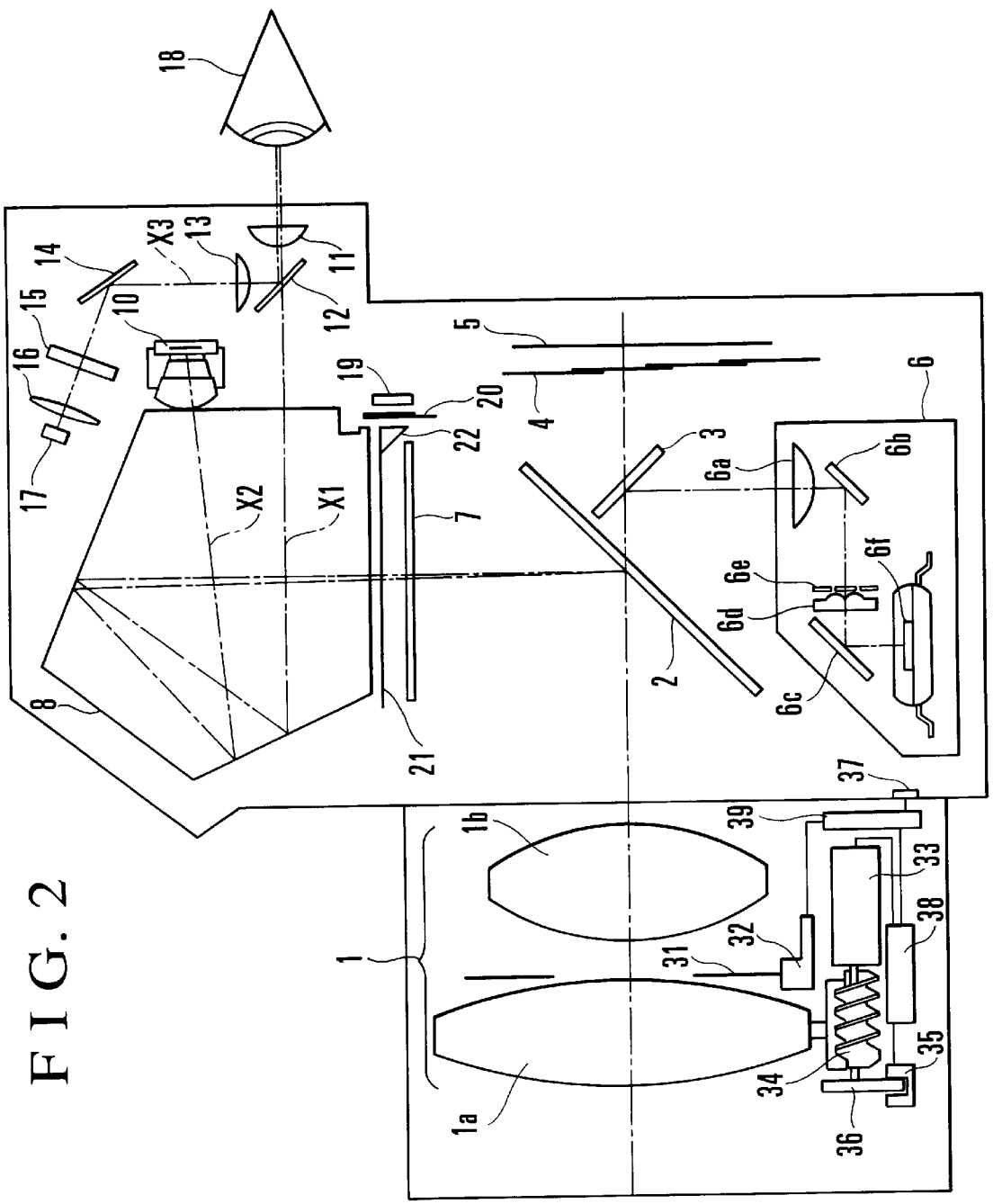
FIG. 2 shows the optical arrangement of the single-lens reflex camera according to the first embodiment.

To the MPU 100 are connected a liquid crystal display circuit 102, the focus detecting circuit 103, the light measuring circuit 104, a shutter control circuit 105, a motor control circuit 106, a film travel detecting circuit 107 and a switch sensing circuit 108. The MPU 100 is connected through a mount contact 37 which is shown in FIG. 2 to a lens control circuit 39 which is disposed within a photo-taking lens 1 in such a way as to make signal transmission possible. Further, an external flash circuit 110 is also connected to the MPU 100 through a flash contact 111 for signal transmission.

The liquid crystal display circuit 102 is arranged to control, in accordance with signals from the MPU 100, an intra-viewfinder LCD 15 which is a liquid crystal panel for displaying focus detecting areas within a viewfinder field and another intra-viewfinder LCD 20 which is a liquid crystal panel for displaying photo-taking information outside of the viewfinder field.

The focus detecting circuit 103 is arranged to control, in accordance with signals from the MPU 100, an accumulating action and a read-out action of a focus detecting area sensor 6f (shown in FIG. 2) and to send pixel information to the MPU 100. The MPU 100 A/D(analog-to-digital)-converts the pixel information and detects focus by a known phase difference detecting method. The focus detection information thus obtained is sent to the lens control circuit 39 to adjust the focus of the photo-taking lens 1 accordingly.

The light measuring circuit 104 is arranged to send the output of a light measuring sensor 10 to the MPU 100 as a luminance signal for each of the areas of an image plane. The MPU 100 then A/D-converts the luminance signal and adjusts a photo-taking exposure. In the case of the first embodiment, flash control is performed in such a way as to decide the amount of flash light emission for a photo-taking operation by making preliminary light emission immediately before the flash light emission for the photo-taking operation. The light measurement during the preliminary light emission is performed also by the light measuring sensor 10.

The shutter control circuit 105 is arranged to perform exposure control in accordance with signals from the MPU 100 to cause a leading shutter curtain to travel by energizing a magnet MG-1 and to cause the trailing shutter curtain to travel by energizing a magnet MG-2.

The motor control circuit 106 is arranged to control the actions of moving a main mirror 2 (see FIG. 2) up and down, charging the shutter and transporting a film by controlling a motor M in accordance with signals from the MPU 100.

The film travel detecting circuit 107 is arranged to detect whether one frame portion of the film is wound up in transporting the film and to send a signal to the MPU 100 upon detection of completion of the one-frame winding action on the film.

A switch SW1 is arranged to be turned on by a first stroke (halfway pushing) operation on a release button which is not shown. With the switch SW1 turned on, a light measuring action and an automatic focusing (AF) action begin. A switch SW2 is arranged to be turned on by a second stroke (full pushing) operation on the release button. With the switch SW2 turned on, an exposure action begins.

A continuous shooting mode switch CSSW is provided for setting the mode of photo-taking actions of the camera. The camera is set in a continuous shooting mode when the switch CSSW is turned on, and is set in a single shooting mode when the switch CSSW is turned off. The switch sensing circuit 108 is arranged to detect the states of these switches and other operation members of the camera and to send signals indicating the states of these operation members to the MPU 100.

The external flash circuit 110 has a flash bracketing mode switch FBSW which is provided for setting a flash bracketing photo-taking mode. The signal of the flash bracketing mod switch FBSW is arranged to be sent to the MPU 100 by communication.

FIG. 2 shows the optical arrangement of the above single-lens reflex camera. In FIG. 2, all parts that are the same as those shown in FIG. 1 are indicated by the same reference numerals. Reference numeral 1 denotes a photo-taking lens. In FIG. 2, the photo-taking lens 1 is shown as being composed of two lenses 1a and 1b for the sake of expedience. In actuality, the photo-taking lens 1 is composed of a number of lenses.

The main mirror 2 is arranged either to be set obliquely in the photo-taking optical path when the camera is in an observing state or to be extracted from the photo-taking optical path when the camera is in a photo-taking state. A sub-mirror 3 is arranged to reflect downward a light flux which passes through the main mirror 2 while the main mirror 2 is set aslant in the photo-taking optical path. Reference numeral 4 denotes the shutter. A photosensitive member 5 is a silver-halide film, a solid-state image sensor of a CCD or MOS type, or a camera tube such as a vidicon.

A focus detecting device 6 is composed of a field lens 6a which is disposed in the neighborhood of an image forming plane, reflection mirrors 6b and 6c, a secondary image forming lens 6d, a diaphragm 6e, an area sensor 6f having a plurality of CCDs, etc. The focus detecting device 6 is thus arranged to detect focus by a known phase difference method.

A focusing screen 7 is set on a prescribed image forming plane. A pentagonal prism 8 is arranged to be used for bending a viewfinder optical path. An image forming lens 9 and the light measuring sensor 10 are provided in combination for measuring the object luminance obtained within an observing image plane. The image forming lens 9 is arranged to have the focusing screen 7 and the light measuring sensor 10 in a conjugate relation to each other through a reflection optical path obtained within the pentagonal prism 8.

Light coming from the object of shooting is taken into the photo-taking lens 1 (viewfinder rays of light X1 and X2) and is imaged on the focusing screen 7 through the main mirror 2. The image thus formed on the focusing screen 7 is led through the pentagonal prism 8 to an eyepiece 11 as, rays of light X1, and to the image forming lens 9, as rays of light X2. At the same time, rays of light X3 for a display are combined by a half-mirror 12 with the viewfinder rays of light X1 into a composite image, which reaches the pupil 18 of a viewer to be viewed through the eyepiece 11.

The display light X3 is next described. Light emitted from a back-light LED 17 first falls on a Fresnel lens 16 to be converged there. The converged light then falls on a focus-detecting-area display liquid crystal panel 15 on which display segments corresponding to a plurality of focus detecting areas are formed. As a result, a light flux passing through the focus-detecting-area display liquid crystal panel 15 comes to be reflected by a mirror 14. The reflected light flux is converged by an image projecting lens 13. After that, the light flux is combined with the viewfinder light X1 by the half-mirror 12 into the composite image, which is led to the eyepiece 11.

The camera is provided with a viewfinder field mask 21. The intra-viewfinder LCD 20 which is provided for displaying photo-taking information outside of viewfinder field is arranged to be illuminated by an illuminating LED 19 (F-LED). Light which passes through the intra-viewfinder LCD 20 is led to the inside of the viewfinder by a trigonal prism 22 to enable the viewer to see the photo-taking information.

A diaphragm 31 is disposed within the photo-taking lens 1. The photo-taking lens 1 is provided with a diaphragm driving circuit 32, a lens driving motor 33, and a lens driving member 34 which is composed of driving gears, etc. A photo-coupler 35 is arranged to detect the rotation of a pulse plate 36 which is interlocked with the lens driving member 34. The rotation of the pulse plate 36 is transmitted to a lens focus adjusting circuit 38. The lens focus adjusting circuit 38 is arranged to move the focusing lens 1a of the photo-taking lens 1 to an in-focus position by driving the lens driving motor 33 to a predetermined extent on the basis of information from the photo-coupler 35 and information on a lens driving amount coming from the lens control circuit 39. The lens control circuit 39 is arranged to control the lens focus adjusting circuit 38 and the diaphragm driving circuit 32 on the basis of information coming from the camera body.

The operation of the single-lens reflex camera according to the first embodiment of the invention is next described with reference to FIGS. 3, 4 and 5 which are flow charts, as follows.

Figure 3:
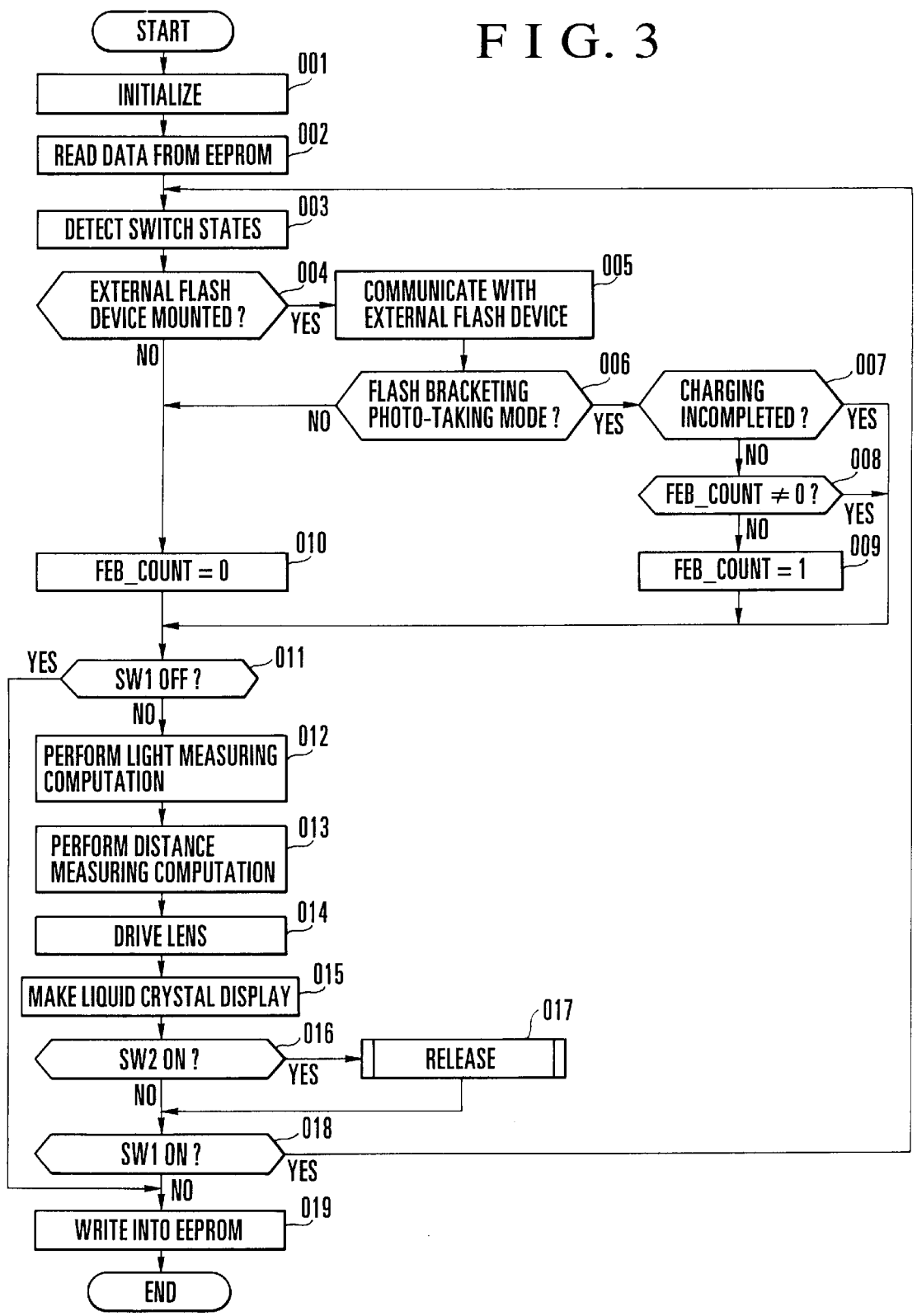
FIG. 3 is a flow chart showing a sequence of control actions in the first embodiment.

At a step 001 of FIG. 3, when the camera begins to operate, the MPU 100 first initializes the internal contents thereof. At a step 002, photo-taking data such as flash bracketing information, etc., is read out from the EEPROM 100b which is disposed within the MPU 100.

At a step 003, the MPU 100 communicates with the switch sensing circuit 108 to detect the positions of switches.

At a step 004, a check is made to find if the external flash device is mounted on the camera. If so, the flow of operation proceeds to a step 005. If not, the flow proceeds to a step 010.

At the step 005, the MPU 100 communicates with the external flash device to obtain information about the external flash device, such as information about setting of a flash bracketing photo-taking mode, about the state of charging, etc.

At a step 006, a check is made to find if the flash bracketing photo-taking mode is set. If so, the flow proceeds to a step 007. If not, the flow proceeds to the step 010.

At the step 007, a check is made to find whether a charge voltage of the flash device is lower than a light emission enabling voltage, i.e., for incompletion of a charging process of the external flash device. If the charging process is found to be not completed, the flow proceeds to a step 011. If the charging process is found to be completed, the flow proceeds to a step 008.

At the step 008, a check is made to find if a flag FEB_COUNT which indicates the photo-taking scene number in the flash bracketing photo-taking mode is at "≠0". If so, the flow proceeds to the step 010. If the flag FEB_COUNT is at "0", the flow proceeds to a step 009.

At the step 009, the flag FEB_COUNT is set to "1" to indicate a first scene to be taken in the flash bracketing photo-taking mode. The flow then proceeds to the step 011.

At the step 010, information relative to the external flash device is cleared as the flash device is not mounted on the camera. After this step, the camera can be judged to be not in the flash bracketing photo-taking mode when the flag FEB_COUNT is at "0".

At the step 011, a check is made to find if the switch SW1 is in its off-state. If so, the flow proceeds to a step 019 (step of writing into the EEPROM) to write photo-taking information into the EEPROM 100b, and the program is ended. If the switch SW1 is found to be in its on-state, the flow proceeds to a step 012 to make preparations for a photo-taking operation.

At the step 012, a shutter speed and an aperture value of the lens are computed and obtained on the basis of information on the luminance of the object of shooting obtained from the light measuring circuit 104.

At the next step 013, the focus detecting circuit 103 is caused to perform a focus detecting action by the phase difference detecting method as mentioned in the foregoing.

At a step 014, the MPU 100 controls and causes the lens control circuit 39 to adjust the focus of the photo-taking lens 1 according to a state of focus detected by the focus detecting action performed at the step 013. At a step 015, the MPU 100 communicates with the liquid crystal display circuit 102 to cause the shutter speed and the aperture value obtained at the step 012 and the result of focus detection obtained at the step 013 to be displayed within the viewfinder.

At a step 016, a check is made for the state of the switch SW2. If the switch SW2 is found to be in its off-state, the flow proceeds to a step 018. If the switch SW2 is found to be in its on-state, the flow proceeds to a step 017 to control release actions for exposing the film to light.

Figure 4:
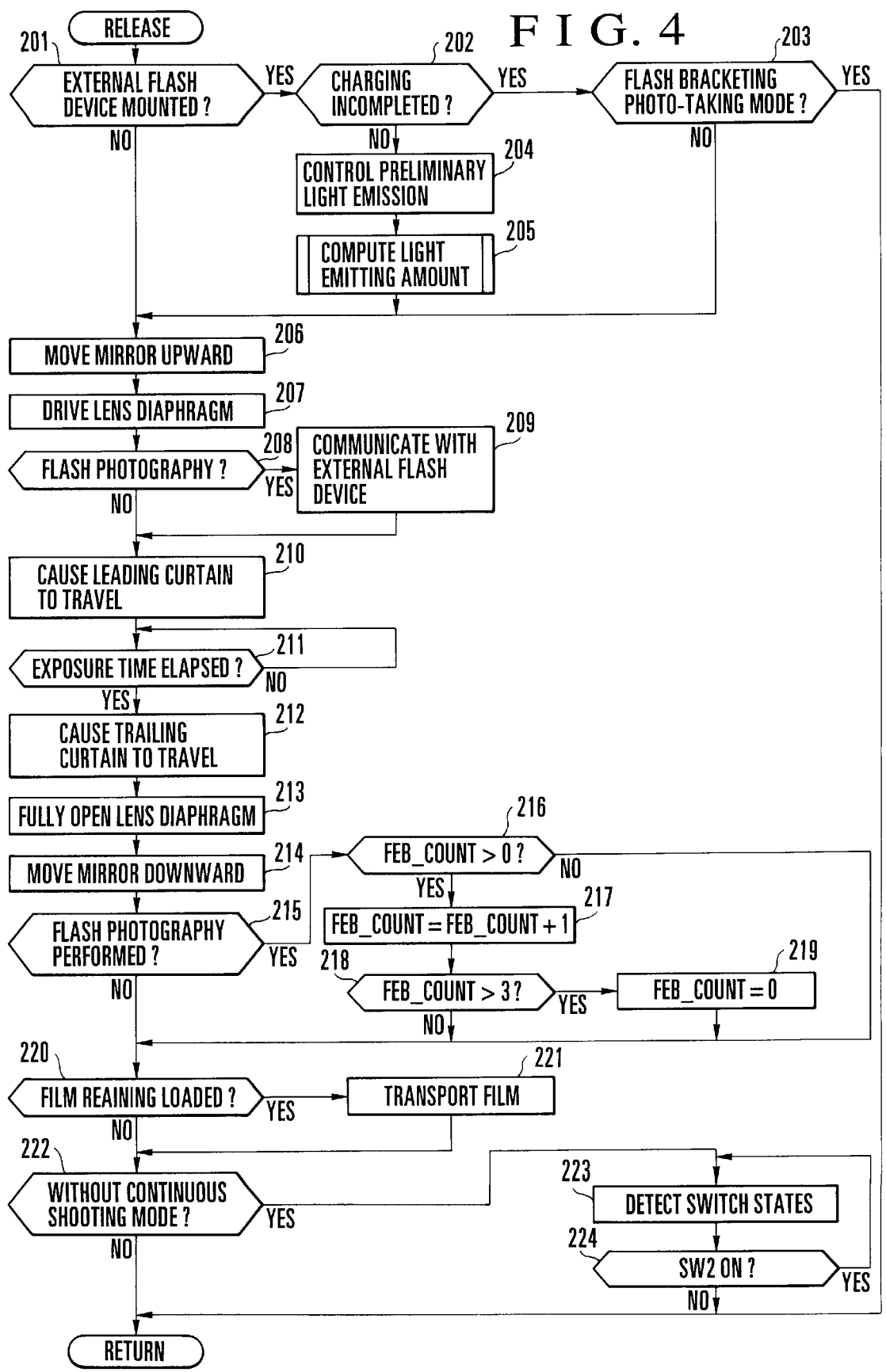
FIG. 4 is a flow chart showing release actions of the camera in the first embodiment.

FIG. 4 shows the details of the release control of the step 017 of FIG. 3. The release control is executed as follows. At a step 201 of FIG. 4, a check is made to find if the external flash device is mounted. If so, the flow of operation proceeds to a step 202. If not, the flow proceeds to a step 206.

At the step 202, a check is made for the state of a charging process of the flash device. If the charging process is found to be not completed as yet, the flow proceeds to a step 203. If the charging process is found to have been completed, the flow proceeds to a step 204.

At the step 203, a check is made to find if the flash bracketing photo-taking mode is set. If so, the flow returns to the step 108 of FIG. 3, without allowing the release actions (photo-taking actions), i.e., by inhibiting the release actions. If not, the flow proceeds to the step 206 to begin to perform the release actions.

At the step 204, the preliminary light emission of the external flash device is controlled. Then, an amount of preliminary light emission ΔF which impinges on the object of shooting is computed and obtained from the output of the light measuring circuit 104. Further, information on the amount of the preliminary light emission which is made at that time is received by communication with the flash device and is stored as data PRE-LEVEL.

At the next step 205, a flash light emitting amount is computed. The details of the computing operation of the flash light emitting amount are described below with reference to the flow chart of FIG. 5.

Figure 5:
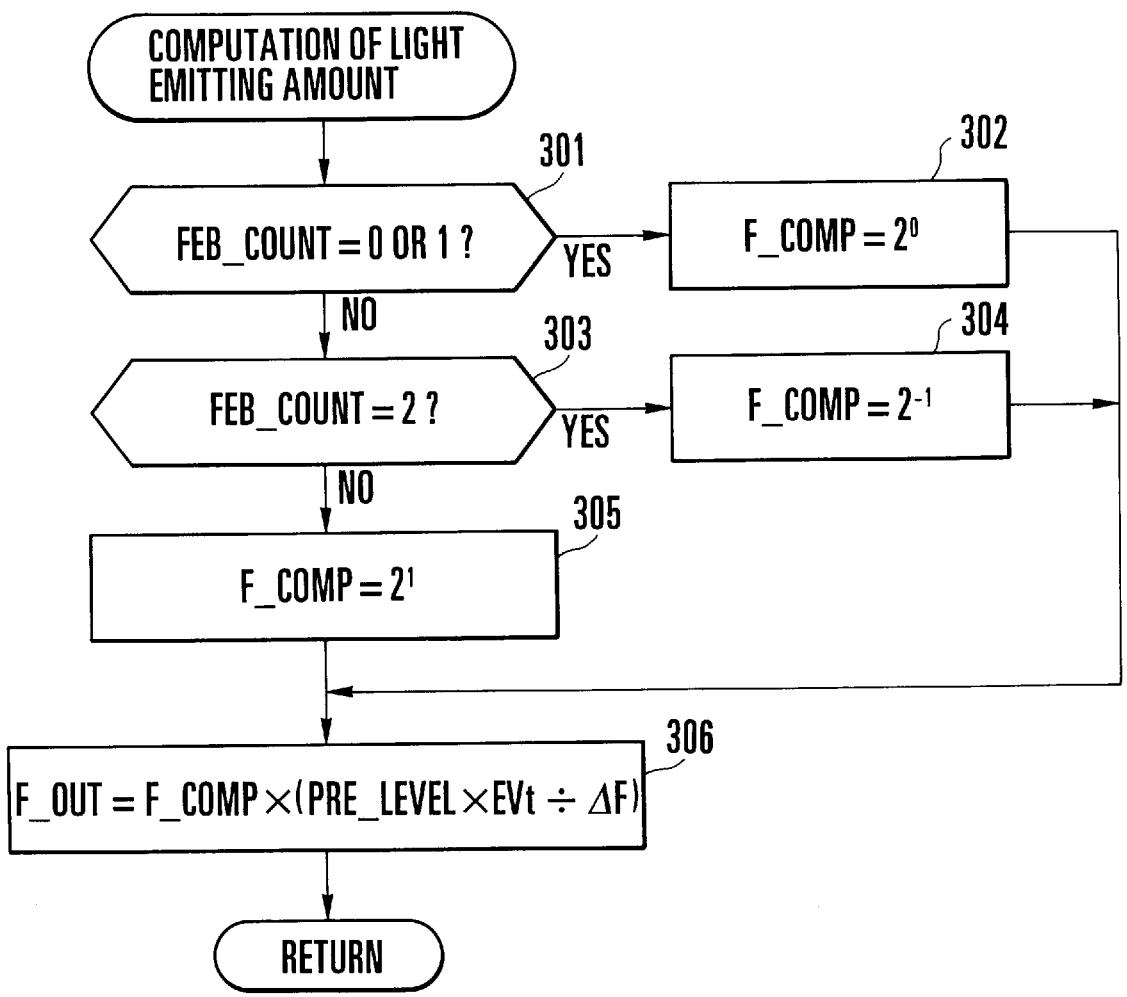
FIG. 5 is a flow chart showing processes for computing an amount of flash light emission to be carried out by the camera in the first embodiment.

At a step 301 of FIG. 5, a check is made to find if the flag FEB_COUNT is either at "0" or "1". If so, the flow proceeds to a step 302 to set a light control correcting amount F_COMP to "$2^0$". If not, the flow proceeds to a step 303.

At the step 303, a check is made to find if the flag FEB_COUNT is at "2". If so, the flow proceeds to a step 304 to set the light control correcting amount F_COMP to "$2^{-1}$". If the flag FEB_COUNT is found to be at a value larger than "2", the flow proceeds to a step 305 to set the light control correcting amount F-COMP to "$2^1$". In other words, no light control correction is applied in a case where the camera is either not in the flash bracketing photo-taking mode or at the first scene (shot) in one sequence of the flash bracketing photo-taking mode. The light control correction is applied by −1 step in the case of a second scene in one sequence of the flash bracketing photo-taking mode and by +1 step in the case of a third scene or a scene subsequent to the third scene in one sequence of the flash bracketing photo-taking mode.

At a step 306, an amount of main light emission F_OUT of the flash device is computed as follows, before the flow returns to the flow of FIG. 4:

$$F\_OUT = F\_COMP \times (PRE\_LEVEL \times EVt \div \Delta F)$$

where

F_COMP: a light control correcting amount

PRE_LEVEL: an amount of preliminary light emission from the flash device

EVt: a target amount of exposure

ΔF: an amount of preliminary light emission impinging on the object of shooting.

In the case of the first embodiment, arithmetic operations for obtaining a flash exposure amount and the result of light measurement are carried out in APEX values.

Referring again to the flow chart of FIG. 4, at a step 206, the main mirror 2 is moved upward by driving the motor M through the motor control circuit 106.

At the next step 207, information on an aperture value is sent to the lens control circuit 39. In accordance with the information on the aperture value, the aperture of the diaphragm 31 of the photo-taking lens 1 is stopped down to a position corresponding to the value designated.

At a step 208, a check is made to find if flash photography is selected. If so, the flow proceeds to a step 209 to communicate with the external flash device to send information on a flash light emitting amount and a signal for the commencement of light emission. If not, the flow proceeds to a step 210. At the step 210, the shutter control circuit 105 is caused to allow the leading curtain of the shutter to travel.

At a step 211, a check is made to find if a set length of exposure time has elapsed. If not, the flow loops around this step to wait for the lapse of the exposure time. If so, the flow proceeds to a step 212.

At the step 212, the shutter control circuit 105 is caused to allow the trailing curtain of the shutter to travel.

At a step 213, the MPU 100 communicates with the lens control circuit 39 to have the diaphragm 31 fully opened.

At a step 214, the motor M is caused to be driven through the motor control circuit 106 to move the main mirror 2 down.

At the next step 215, a check is made to find if a flash photo-taking operation has been performed. If so, the flow proceeds to a step 216. If a photo-taking operation is found to have been performed without using the flash device, the flow proceeds to a step 220.

At the step 216, a check is made to find if the flag FEB_COUNT is in a state of "FEB_COUNT>0". If so, the flow proceeds to a step 217. If not, the flow proceeds to a step 220.

At the step 217, the count of scenes (shots) taken in the flash bracketing photo-taking mode is incremented by one by carrying out an arithmetic operation of "FEB_COUNT=FEB_COUNT+1".

At a step 218, a check is made to find if the flag FEB_COUNT is in a state of "FEB_COUNT>3". If so, the flow proceeds to a step 219 to set the flag FEB_COUNT in a state of "FEB_COUNT=0". If not, the flow proceeds to the step 220. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 220. At the step 220, a check is made to find if the camera is loaded with the film. If so, the flow proceeds to a step 221. At the step 221, the film is transported to an extent corresponding to one frame portion thereof, and the flow proceeds to a step 222. If the camera is found at the step 220 to be not loaded with any film, the flow proceeds from the step 220 directly to the step 222.

At the step 222, a check is made for setting of a continuous shooting mode. If the camera is found to be not in the continuous shooting mode, the flow proceeds to a step 223 to read switch position information. The flow then proceeds from the step 223 to a step 224. If the camera is found at the step 222 to be in the continuous shooting mode, the flow returns to the step 018 of FIG. 3.

At the step 224, a check is made to find if the switch SW2 which is a release operation switch is in its on-state. If so, the flow loops around the steps 223 and 224. If the switch SW2 is found to be in its off-state, the flow returns to the step 018 of FIG. 3.

With the control operation on release actions having been finished in the manner described above, the flow returns to the step 018 of FIG. 3. At the step 018, a check is made to find if the switch SW1 is in its on-state. If so, the flow returns from the step 018 to the step 003. If the switch SW1 is found to be in its off-state, the flow proceeds to a step 019. At the step 019, a variety of pieces of photo-taking information, such as the flash bracketing information, etc., are stored in the EEPROM 100b, and the program comes to an end.

(Second Embodiment)

Figure 6:
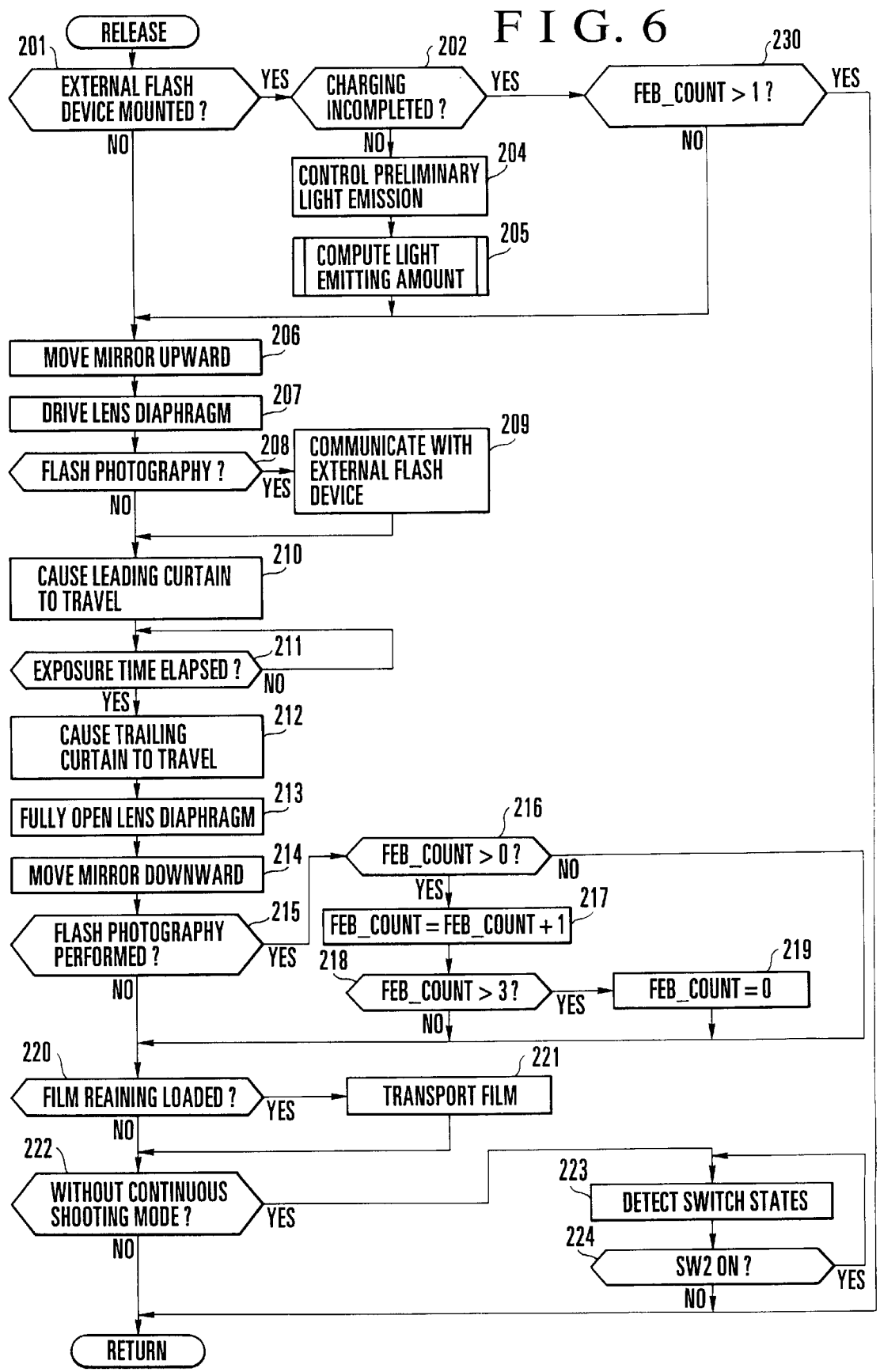
FIG. 6 is a flow chart showing release actions of a camera according to a second embodiment of the invention.

A release control operation of a camera according to a second embodiment of the invention is next described referring to FIG. 6 which is a flow chart. The control over camera actions other than release actions and the arrangement of the camera in the second embodiment are the same as those of the first embodiment described in the foregoing.

At a step 201 of FIG. 6, a check is made to find if the external flash device is mounted. If so, the flow of operation proceeds to a step 202. If not, the flow proceeds to a step 206.

At the step 202, a check is made to find if a charging process is completed at the flash device. If not, the flow proceeds to a step 230. If so, the flow proceeds to a step 204.

At the step 230, the flag FEB_COUNT is checked to find if it is in a state of FEB_COUNT>1 (after at least one shot of scene is taken). If so, the flow returns to the step 018 of FIG. 3 without performing release actions (i.e., inhibiting photo-taking actions). If the flag FEB_COUNT is in a state of "FEB_COUNT=0" (indicating that no shot of scene has been taken as yet), the flow proceeds to a step 206 to initiate release actions.

Further, at the step 204, the preliminary light emission of the external flash device is controlled. Then, an amount of preliminary light emission ΔF which has impinged on the object of shooting is computed and obtained from the output of the light measuring circuit 104. Further, information on the amount of preliminary light emission which is made at that time is received by communication with the flash device and is stored as data PRE_LEVEL.

At a step 205, an amount of flash light emission is computed in the same manner as the procedures of the first embodiment shown in the flow chart of FIG. 5. The flow then proceeds from the step 205 to a step 206.

At the step 206, the main mirror 2 is moved upward by driving the motor M through the motor control circuit 106.

At the next step 207, information on an aperture value is sent to the lens control circuit 39. In accordance with the information on the aperture value, the aperture of the diaphragm 31 of the photo-taking lens 1 is stopped down to a position corresponding to the designated value.

At a step 208, a check is made to find if flash photography is selected. If so, the flow proceeds to a step 209 to communicate with the external flash device to send information on the amount of flash light emission and a signal for the commencement of flash light emission. If not, the flow proceeds to a step 210. At the step 210, the shutter control circuit 105 is caused to allow the leading curtain of the shutter to travel.

At a step 211, a check is made to find if a set length of exposure time has elapsed. If not, the flow loops around this step to wait for the lapse of the exposure time. If so, the flow proceeds to a step 212. At the step 212, the shutter control circuit 105 is caused to allow the trailing curtain of the shutter to travel.

At a step 213, the MPU 100 communicates with the lens control circuit 39 to have the diaphragm 31 fully opened.

At a step 214, the motor M is caused to be driven through the motor control circuit 106 to move the main mirror 2 down.

At the next step 215, a check is made to find if a flash photo-taking operation has been performed. If so, the flow proceeds to a step 216. If a photo-taking operation is found to have been performed without using the flash device, the flow proceeds to a step 220.

At the step 216, a check is made to find if the flag FEB_COUNT is in a sate of "FEB_COUNT>0". If so, the flow proceeds to a step 217. If not, the flow proceeds to a step 220. At the step 217, the count of shots of scenes taken in the flash bracketing photo-taking mode is incremented by one by carrying out an arithmetic operation of "FEB_COUNT=FEB_COUNT+1".

At a step 218, a check is made to find if the flag FEB_COUNT is in a state of "FEB_COUNT>3". If so, the flow proceeds to a step 219 to set the flag FEB_COUNT to a state of "FEB_COUNT=0". If not, the flow proceeds to the step 220. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 220. At the step 220, a check is made to find if the camera is loaded with the film. If so, the flow proceeds to a step 221. At the step 221, the film is transported to an extent corresponding to one frame portion thereof, and the flow proceeds to a step 222. If the camera is found at the step 220 to be not loaded with any film, the flow proceeds from the step 220 directly to the step 222.

At the step 222, a check is made for setting of a continuous shooting mode. If the camera is found to be not set in the continuous shooting mode, the flow proceeds to a step 223 to read switch position information. The flow then proceeds from the step 223 to a step 224. If the camera is found at the step 222 to be in the continuous shooting mode, the flow returns to the step 018 of FIG. 3.

At the step 224, a check is made to find if the switch SW2 which is a release operation switch is in its on-state. If so, the flow loops around the steps 223 and 224. If the switch SW2 is found to be in its off-state, the flow returns to the step 018 of FIG. 3.

(Third Embodiment)

Figure 7:
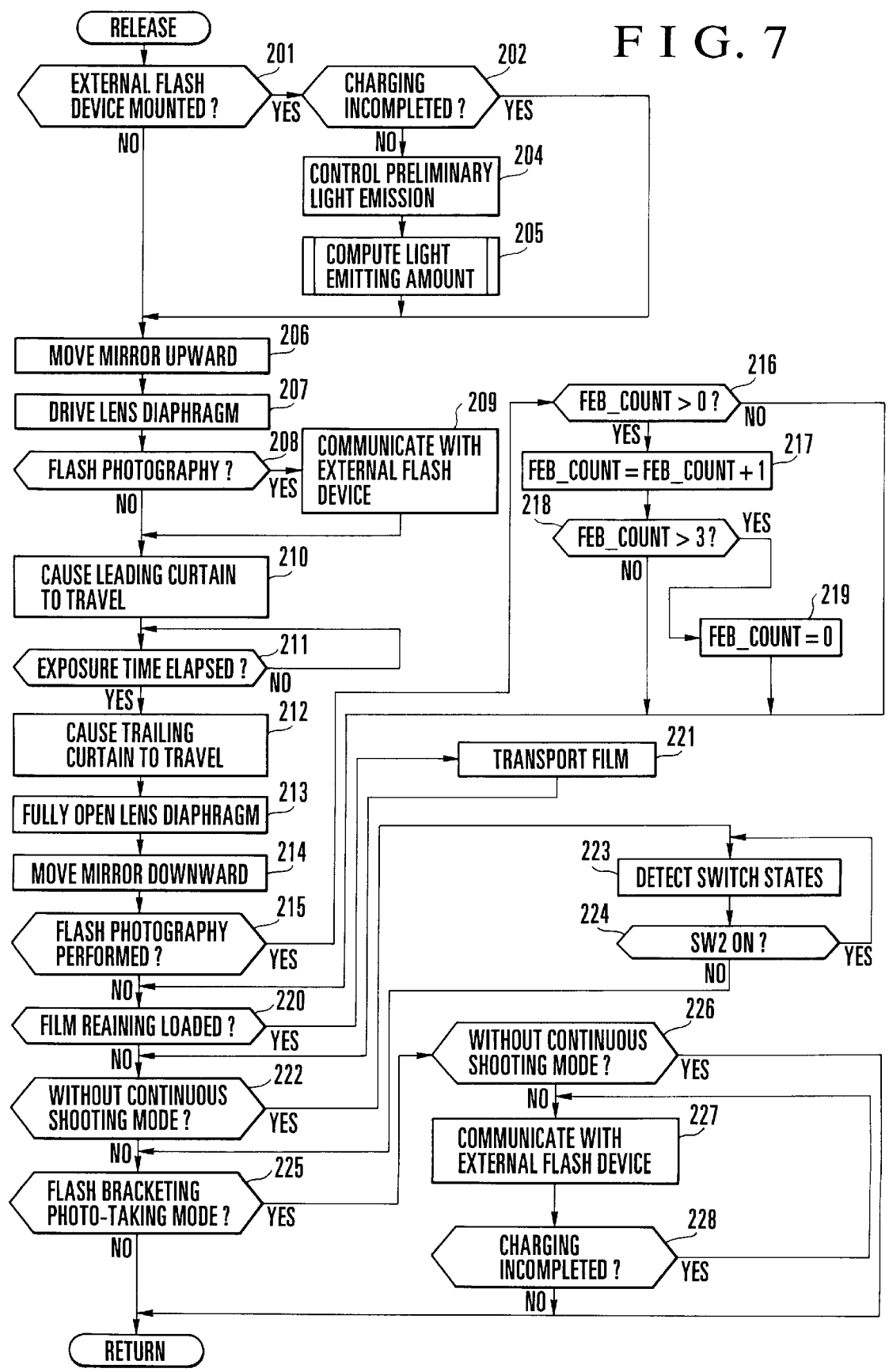
FIG. 7 is a flow chart showing release actions of a camera according to a third embodiment of the invention.

A release control operation of a camera according to a third embodiment of the invention is next described referring to FIG. 7 which is a flow chart. The control over camera actions other than release actions and the arrangement of the camera in the third embodiment are the same as those of the first embodiment described in the foregoing.

At a step 201 of FIG. 7, a check is made to find if the external flash device is mounted. If so, the flow of operation proceeds to a step 202. If not, the flow proceeds to a step 206.

At the step 202, a check is made for the state of a charging process of the external flash device. If the charging process is found to be not completed as yet, the flow proceeds to the step 206 to initiate release actions. If the charging process is found to have been completed, the flow proceeds to a step 204.

At the step 204, the preliminary light emission of the external flash device is controlled. An amount of preliminary light emission ΔF which has impinged on the object of shooting is computed and obtained from the output of the light measuring circuit 104. Further, information on the amount of preliminary light emission which is made at that time is received by communication with the flash device and is stored as data PRE_LEVEL.

At a step 205, an amount of flash light emission is computed in the same manner as the procedures of the first embodiment shown in the flow chart of FIG. 5. The flow then proceeds from the step 205 to the step 206.

At the step 206, the main mirror 2 is moved upward by driving the motor M through the motor control circuit 106.

At the next step 207, information on an aperture value is sent to the lens control circuit 39. In accordance with the information on the aperture value, the aperture of the diaphragm 31 of the photo-taking lens 1 is stopped down to a position corresponding to the designated value.

At a step 208, a check is made to find if flash photography is selected. If so, the flow proceeds to a step 209 to communicate with the external flash device to send information on the amount of flash light emission and a signal for the commencement of flash light emission. If not, the flow proceeds to a step 210. At the step 210, the shutter control circuit 105 is caused to allow the leading curtain of the shutter to travel.

At a step 211, a check is made to find if a set length of exposure time has elapsed. If not, the flow loops around this step to wait for the lapse of the exposure time. If so, the flow proceeds to a step 212. At the step 212, the shutter control circuit 105 is caused to allow the trailing curtain of the shutter to travel.

At a step 213, the MPU 100 communicates with the lens control circuit 39 to have the diaphragm 31 fully opened.

At a step 214, the motor M is caused to be driven through the motor control circuit 106 to move the main mirror 2 down.

At the next step 215, a check is made to find if a flash photo-taking operation has finished. If so, the flow proceeds to a step 216. If a photo-taking operation is found to have been performed without using the flash device, the flow proceeds to a step 220.

At the step 216, a check is made to find if the flag FEB_COUNT is in a sate of "FEB_COUNT>0". If so, the flow proceeds to a step 217. If not, the flow proceeds to the step 220. At the step 217, the count of shots of scenes taken in the flash bracketing photo-taking mode is incremented by one by performing an arithmetic operation of "FEB_COUNT=FEB_COUNT+1".

At a step 218, a check is made to find if the flag "FEB_COUNT" is in a state of "FEB_COUNT>3". If so, the flow proceeds to a step 219 to set the flag FEB COUNT to a state of "FEB_COUNT=0". If not, the flow proceeds to the step 220. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 220. At the step 220, a check is made to find if the camera is loaded with the film. If so, the flow proceeds to a step 221. At the step 221, the film is transported to an extent corresponding to one frame portion thereof and the flow proceeds to a step 222. If the camera is found at the step 220 to be not loaded with any film, the flow proceeds from the step 220 directly to the step 222.

At the step 222, a check is made for setting of a continuous shooting mode. If the camera is found to be not set in the continuous shooting mode, the flow proceeds to a step 223 to read switch position information. The flow then proceeds from the step 223 to a step 224. At the step 224, a check is made to find if the switch SW2 which is a release operation switch is in its on-state. If so, the flow loops around the steps 223 and 224. If the switch SW2 is found to be in its off-state, the flow proceeds to a step 225. If the camera is found at the step 222 to be in the continuous shooting mode, the flow proceeds directly to the step 225.

At the step 225, a check is made to find if the flash bracketing photo-taking mode is set. If so, the flow of operation proceeds to a step 226. If not, the flow returns to the step 018 of FIG. 3.

At the step 226, a check is made to find if the sequence of photo-taking actions is set in the continuous shooting mode. If not (if the camera is set in a single shooting mode), the flow returns to the step 018 of FIG. 3. If so (if the camera is set in the continuous shooting mode), the flow proceeds to a step 227 to detect the charge voltage of the external flash device through communication with the flash device.

At a step 228, a check is made for the level of the charge voltage. If the charge voltage is found to be insufficient for light emission, the release actions are inhibited, and the flow loops around the steps 227 and 228 until the charge voltage reaches a level sufficient for light emission. If the charge voltage is found to be sufficient (with a charging process completed), the flow returns to the step 018 of FIG. 3 to allow the next release action in the continuous shooting mode.

In the third embodiment, the steps 225 to 228 are arranged such that, in a case where the camera is set in the continuous shooting mode in the flash bracketing photo-taking mode, the flow of operation waits for completion of a flash device charging process, if the charge voltage of the flash device is found to be lower than a voltage sufficient for light emission. In a case where the camera is set in the single shooting mode in the flash bracketing photo-taking mode, on the other hand, the flow of operation returns from the release control program, so that a photo-taking operation without flash light emission can be performed in response to the next release operation, even if the flash device charging process is not completed.

Further, the step 225 may be changed to make a check to find if the flag FEB_COUNT is in a state of "FEB$_{13}$COUNT>0", instead of making a check for a state of setting the flash bracketing photo-taking mode. With the step 225 arranged in this manner, the flow of operation can be carried on, without passing through the steps 226, 227 and 228, not only in the case of no flash bracketing photo-taking mode but also upon completion of one sequence of flash bracketing. In other words, the process of waiting for completion of the charging process inhibiting the release actions thus can be arranged to be executed only while the flash bracketing is in process.

(Fourth Embodiment)

Figure 8:
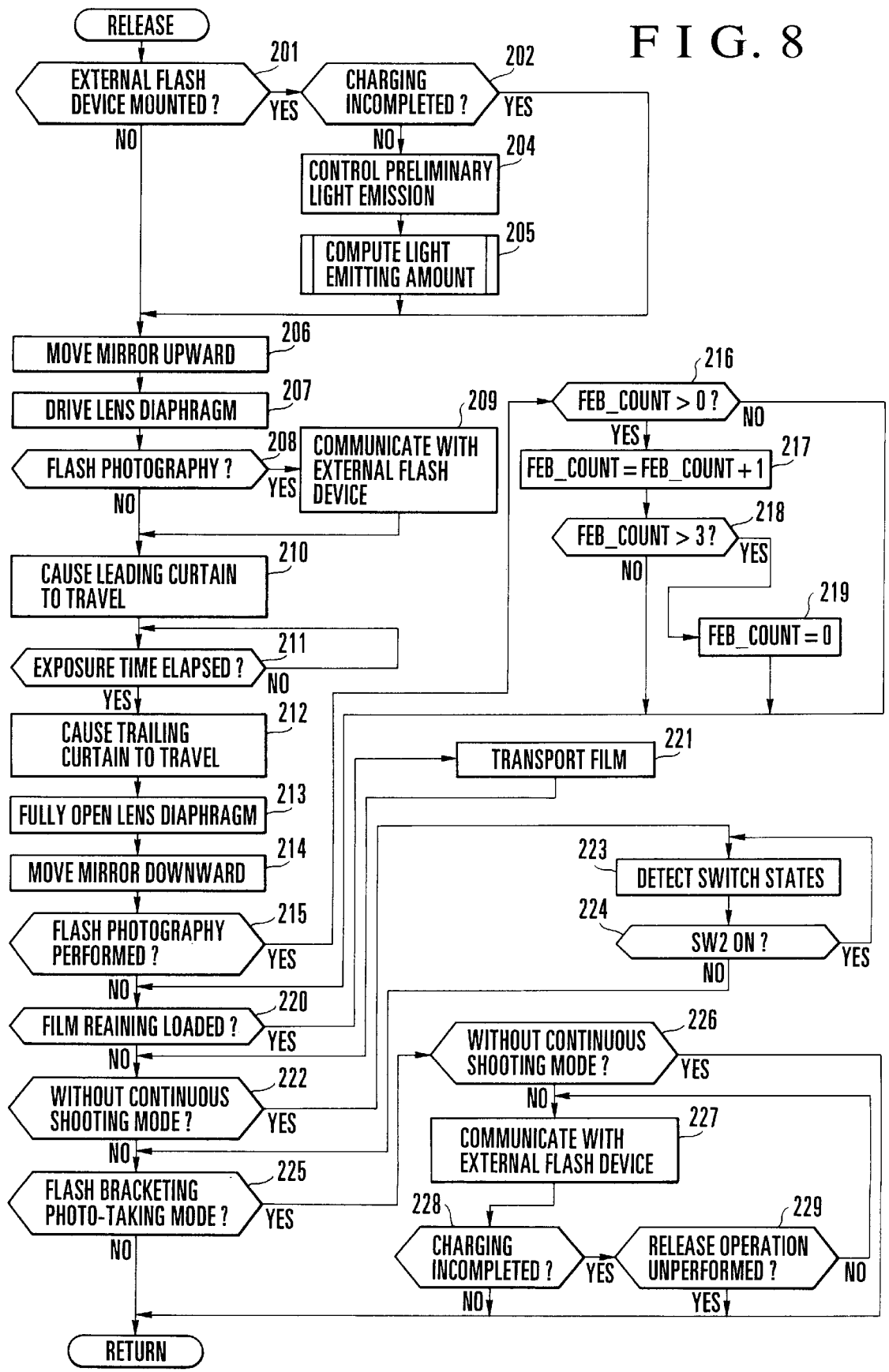
FIG. 8 is a flow chart showing release actions of a camera according to a fourth embodiment of the invention.

A release control operation of a camera according to a fourth embodiment of the invention is next described referring to FIG. 8 which is a flow chart. The control over camera actions other than release actions and the arrangement of the camera in the fourth embodiment are the same as those of the first embodiment described in the foregoing.

At a step 201 of FIG. 8, a check is made to find if the external flash device is mounted. If so, the flow of operation proceeds to a step 202. If not, the flow proceeds to a step 206.

At the step 202, a check is made for the state of a charging process. If the charging process is found to be not completed as yet, the flow proceeds to the step 206 to initiate release actions. If the charging process is found to be completed, the flow proceeds to a step 204.

At the step 204, the preliminary light emission of the external flash device is controlled. An amount of preliminary light emission ΔF which has impinged on the object of shooting is computed and obtained from the output of the light measuring circuit 104. Further, information on the amount of preliminary light emission which is made at that time is received by communication from the flash device and is stored as data PRE_LEVEL.

At a step 205, an amount of flash light emission is computed in the same manner as the procedures of the first embodiment shown in the flow chart of FIG. 5. The flow then proceeds from the step 205 to the step 206.

At the step 206, the main mirror 2 is moved upward by driving the motor M through the motor control circuit 106.

At the next step 207, information on an aperture value is sent to the lens control circuit 39. In accordance with the information the aperture value, the aperture of the diaphragm 31 of the photo-taking lens 1 is stopped down to a position corresponding to the designated value.

At a step 208, a check is made to find if flash photography is selected. If so, the flow proceeds to a step 209 to communicate with the external flash device to send information on an amount of flash light emission and a signal for the commencement of flash light emission. If not, the flow proceeds to a step 210. At the step 210, the shutter control circuit 105 is caused to allow the leading curtain of the shutter to travel.

At a step 211, a check is made to find if a set length of exposure time has elapsed. If not, the flow loops around this step to wait for the lapse of the exposure time. If so, the flow proceeds to a step 212. At the step 212, the shutter control circuit 105 is caused to allow the trailing curtain of the shutter to travel.

At a step 213, the MPU 100 communicates with the lens control circuit 39 to have the diaphragm 31 fully opened.

At a step 214, the motor M is caused to be driven through the motor control circuit 106 to move the main mirror 2 down.

At the next step 215, a check is made to find if a flash photo-taking operation has finished. If so, the flow proceeds to a step 216. If a photo-taking operation is found to have been performed without using the flash device, the flow proceeds to a step 220.

At the step 216, a check is made to find if the flag FEB_COUNT is in a sate of "FEB_COUNT>0". If so, the flow proceeds to a step 217. If not, the flow proceeds to the step 220. At the step 217, the count of shots of scenes taken in the flash bracketing photo-taking mode is incremented by one by performing an arithmetic operation of "FEB_COUNT=FEB_COUNT+1".

At a step 218, a check is made to find if the flag FEB_COUNT is in a state of "FEB_COUNT>3". If so, the flow proceeds to a step 219 to set the flag FEB_COUNT in a state of "FEB_COUNT=0". If not, the flow proceeds to the step 220. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 220. At the step 220, a check is made to find if the camera is loaded with the film. If so, the flow proceeds to a step 221. At the step 221, the film is transported to an extent corresponding to one frame portion thereof, and the flow proceeds to a step 222. If the camera is found at the step 220 to be not loaded with any film, the flow proceeds from the step 220 directly to the step 222.

At the step 222, a check is made for setting of a continuous shooting mode. If the camera is found to be not set in the continuous shooting mode, the flow proceeds to a step 223 to read switch position information. The flow then proceeds from the step 223 to a step 224. At the step 224, a check is made to find if the switch SW2 which is a release operation switch is in its on-state. If so, the flow loops around the steps 223 and 224. If the switch SW2 is found to be in its off-state, the flow proceeds to a step 225. If the camera is found at the step 222 to be in the continuous shooting mode, the flow proceeds directly to the step 225.

At the step 225, a check is made to find if the flash bracketing photo-taking mode is set. If so, the flow of operation proceeds to a step 226. If not, the flow returns to the step 018 of FIG. 3.

At the step 226, a check is made to find if the sequence of photo-taking actions is set in the continuous shooting mode. If not (if the camera is in a single shooting mode), the flow returns to the step 018 of FIG. 3. If so (if the camera is in the continuous shooting mode), the flow proceeds to a step 227 to detect the charge voltage of the external flash device through communication with the external flash device.

At a step 228, a check is made for the level of the charge voltage of the external flash device. If the charge voltage is found to be insufficient for light emission, the flow proceeds to a step 229. At the step 229, a check is made to find if the switch SW2 is in its off-state. If the switch SW2 is in its on-state, the flow loops around the steps 227 and 228 until the charge voltage reaches a level sufficient for light emission. If the switch SW2 is found in its off-state, the flow returns to the step 018 of FIG. 3. Further, if the charge voltage is found at the step 228 to be sufficient (with a charging process completed), the flow returns to the step 018 of FIG. 3 to allow the next release actions in the continuous shooting mode.

In the fourth embodiment, the steps 225 to 229 are arranged such that, in a case where the camera is set in the continuous shooting mode in the flash bracketing photo-taking mode, the flow of operation waits for completion of a flash device charging process, if the charge voltage of the flash device is found to be lower than a voltage sufficient for light emission. However, if the switch SW2 turns off (to cancel the release operation) during the process of waiting for completion of flash device charging, the waiting process is brought to a stop and the flow of operation returns from the release control program, so that a photo-taking operation without flash light can be performed in response to the next release operation, even if the flash device charging process is not completed.

Further, the step 225 may be changed to make a check to find if the flag FEB_COUNT is in a state of "FEB_COUNT>0", instead of making a check for a state of setting the flash bracketing photo-taking mode. With the step 225 arranged in this manner, the flow of operation can be carried on, without passing through the steps 226, 227 and 228, not only in the case of no flash bracketing photo-taking mode but also upon completion of one sequence of flash bracketing. In other words, the process of waiting for completion of the charging process inhibiting the release actions thus can be arranged to be executed only while the flash bracketing is in process.

As described above, each of the first to fourth embodiments is arranged to inhibit photo-taking actions while the charge voltage of the flash device is lower than a light emission enabling voltage with the camera set in the flash bracketing photo-taking mode. Therefore, unlike the conventional camera, a photo-taking operation without flash light can be prevented from being accidentally performed in the flash bracketing photo-taking mode. In addition to that, the continuity of amounts of flash exposure for one sequence of the flash bracketing can be kept unimpaired.

Further, even while the camera is in the flash bracketing photo-taking mode, if continuous shooting is not necessary, a single shooting operation without flash light can be carried out even while the charge voltage of the flash device is at an insufficient level. Further, if each of the first to fourth embodiments is arranged to permit single shooting without flash light when the continuous shooting (release) operation is canceled while the camera is in the state of inhibiting a continuous shooting operation as mentioned above, such arrangement eliminates the fear of missing a shutter operating opportunity in the above-stated photo-taking action inhibiting state.

(Fifth Embodiment)

A single-lens reflex camera according to a fifth embodiment of the invention is next described. The basic arrangement of the fifth embodiment is the same as the arrangement shown in FIGS. 1 and 2. In addition to the basis arrangement, the fifth embodiment has a function called an FE lock function. The FE lock function is performed, when desired by the user of the camera, to decide beforehand an amount of flash light emission by making preliminary light emission prior to a photo-taking operation, without making any preliminary light emission immediately before photo-taking flash light emission. For this purpose, the camera according to the fifth embodiment is provided with an FE lock switch (not shown) for selective application of the FE lock.

The operation of the single-lens reflex camera according to the fifth embodiment is described below referring to FIGS. 9 to 12 which are flow charts.

Figure 9:
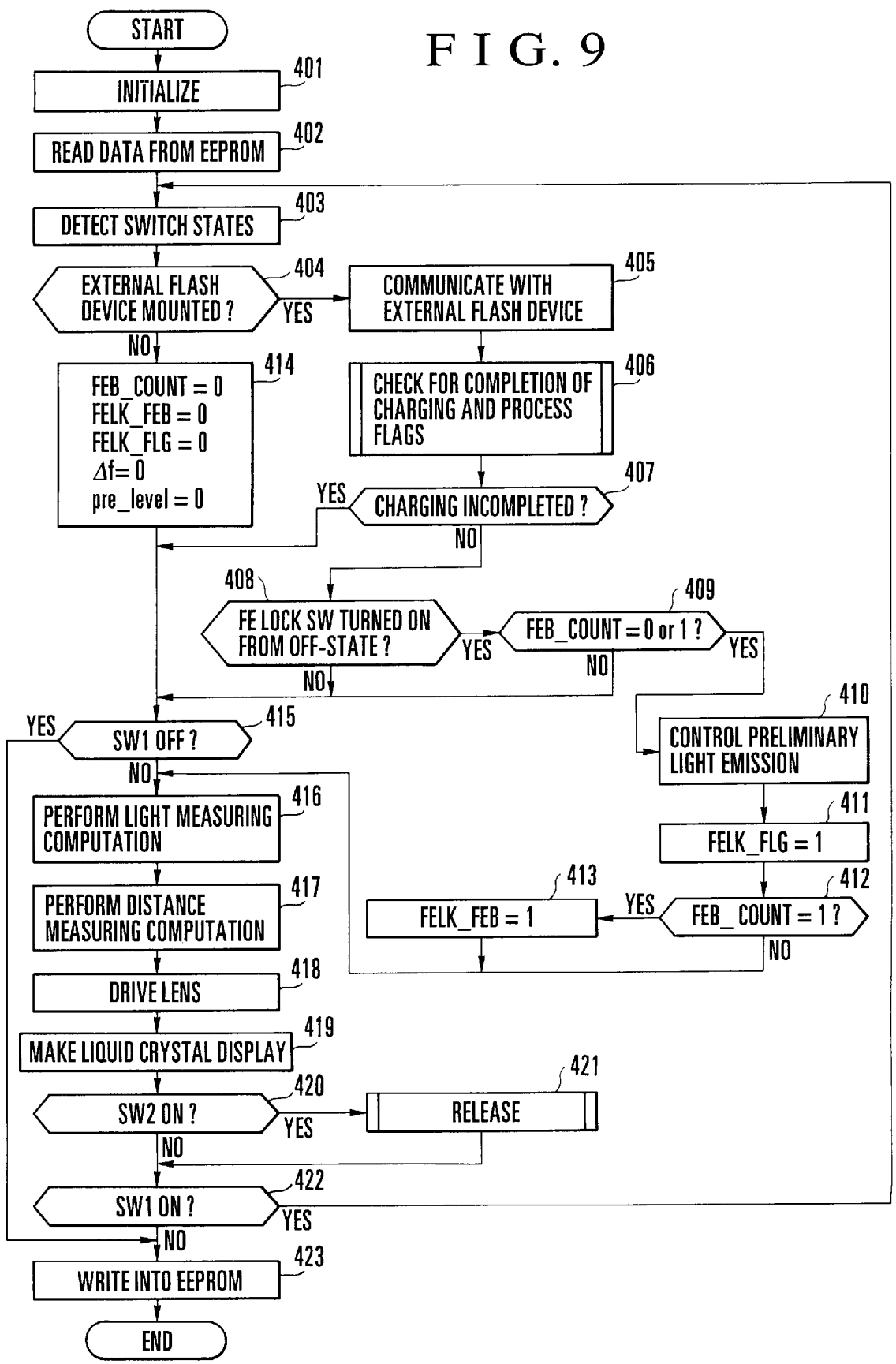
FIG. 9 is a flow chart showing a sequence of control actions of a camera according to a fifth embodiment of the invention.

At a step 401 of FIG. 9, when the camera begins to operate, the MPU 100 first initializes the contents thereof. At a step 402, photo-taking data such as FE lock information, flash bracketing information, etc., is read out from the EEPROM 100b which is disposed within the MPU 100.

At a step 403, the MPU 100 communicates with the switch sensing circuit 108 to detect the positions of switches.

At a step 404, a check is made to find if the external flash device is mounted on the camera. If so, the flow of operation proceeds to a step 405. If not, the flow proceeds to a step 414.

At the step 405, the MPU 100 communicates with the external flash device to obtain information about a flash bracketing photo-taking mode, the state of charge voltage, etc.

At the next step 406, the information from the flash device is examined for completion of a charging process and a flag processing action is performed. The details of the step 406 are described below with reference to the flow chart of FIG. 10.

Figure 10:
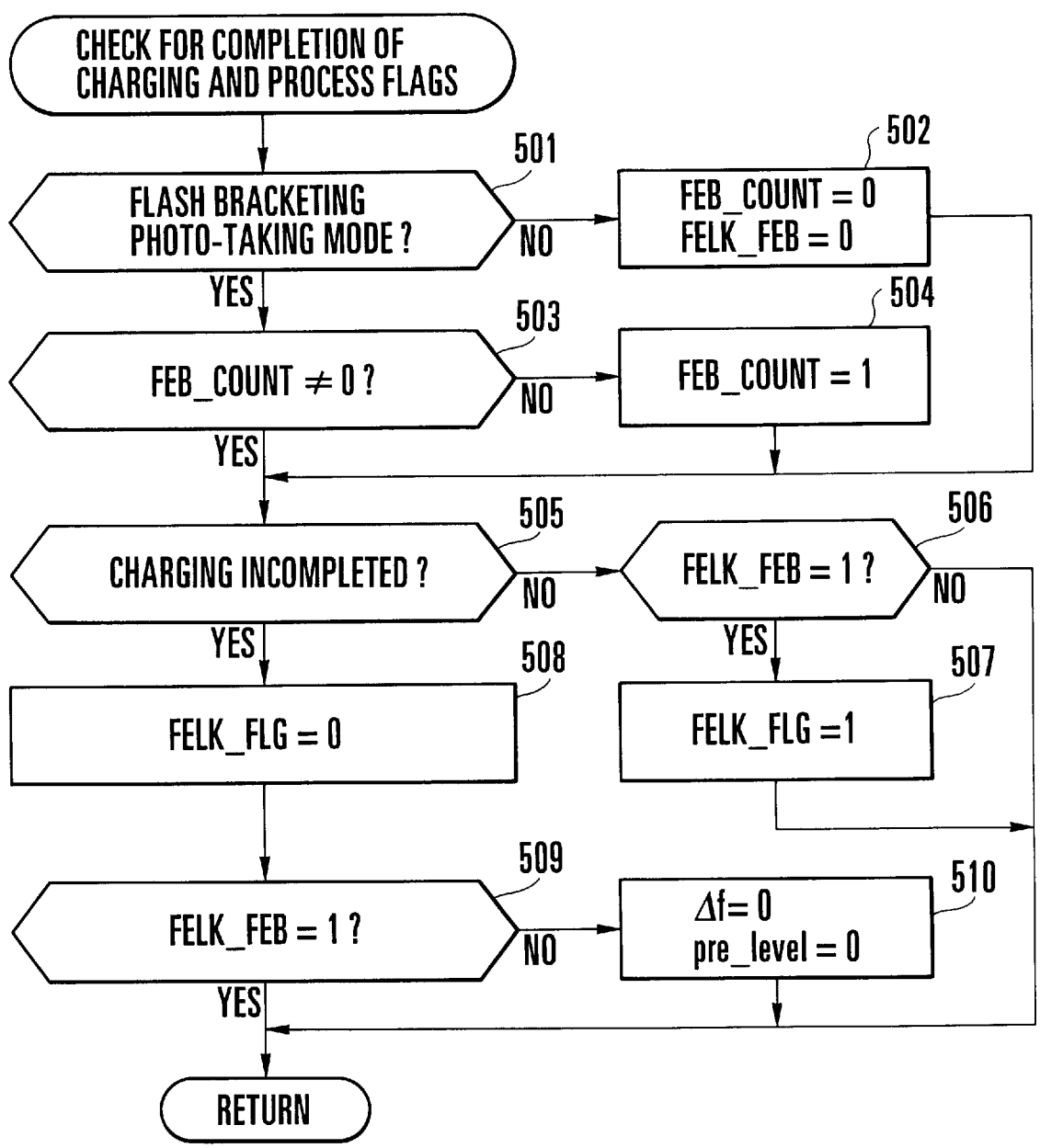
FIG. 10 is a flow chart showing control actions of the camera according to the fifth embodiment, including a check for completion of charging and a flag processing action.

At a step 501 of FIG. 10, a check is made to find if the flash bracketing photo-taking mode is set. If so, the flow of operation proceeds to a step 503. If not, the flow proceeds to a step 502. At the step 502, a flag FEB_COUNT which indicates a number of the shot of scenes taken in the flash bracketing photo-taking mode and another flag FELK_FEB which indicates whether or not the FE lock is applied in the flash bracketing photo-taking mode (but does not indicate that the camera is in an FE locked state) are cleared. The flow then proceeds from the step 502 to a step 505. After the step 502, the camera can be judged to be not set in the flash bracketing photo-taking mode when the flag FEB_COUNT is at "0".

At the step 503, a check is made to find if the flag FEB_COUNT is not at "0". If the flag FEB_COUNT is not at "0", the flow proceeds to the step 505. If the flag FEB_COUNT is at "0", the flow proceeds to a step 504. At the step 504, the flag FEB_COUNT is set t "1" to indicate a first shot of a scene in the flash bracketing photo-taking mode. The flow then proceeds to the step 505.

At the step 505, a check is made for completion of charging the flash device, i.e., to find if the charge voltage of the flash device is lower than a level at which light emission is possible. If not, the flow proceeds to a step 508. If so, the flow proceeds to a step 506.

At the step 506, a check is made to find if the flag FELK_FEB is at "1" indicating that the FE lock is applied in the flash bracketing photo-taking mode. If so, the flow proceeds to a step 507. If not, the flow returns from the step 507 to a step 407 of FIG. 9.

At the step 507, a flag FELK-FLG which indicates an FE lock state is set to "1" to indicate that the camera is in the FE locked state. The flow then returns from the step 507 to the step 407 of FIG. 9.

At the step 508, the flag FELK_FLG is set to "0", so that the FE lock is canceled.

At a step 509, a check is made to find if the flag FELK_FEB is at "1". If not, the flow proceeds to a step 510. At the step 510, data Δf (an amount of preliminary light emission which has impinged on the object of shooting) and data "pre_level" (an amount of preliminary light emission), which are FE lock information, are cleared. The flow then returns to the step 407 of FIG. 9.

If the flag FELK_FEB is found at the step 509 to be at "1", the flow returns directly from the step 509 to the step 407 of FIG. 9. In other words, in a case where the FE lock is applied in the flash bracketing photo-taking mode, the data Δf and the data "pre_level" which are to be used in computing an amount of light emission in the FE locked state are retained without being cleared, even when the FE lock is canceled due to a low charge voltage level of the flash device.

When the charge voltage of the flash device is found to be sufficient for light emission by the next round of flow, the FE lock state (FELK_FLG=1) is resumed at the step 507. After that, the FE lock information comes to be used for computing an amount of light emission (at a step 604 of FIG. 11).

Referring again to FIG. 9, at the step 407, a check is made to find if a charging process of the flash device is incomplete. If the charging process of the flash device is incomplete, the flow proceeds to a step 415. If the charging process of the flash device is completed, the flow proceeds to a step 408.

At the step 408, a check is made to find if the FE lock switch (not shown) has turned on from its off-state. If so, the flow proceeds to a step 409. If not, the flow proceeds to the step 415.

At the step 409, a check is made to find if the flag FEB_COUNT is either at "0" or "1". If so, the flow proceeds to a step 410. At the step 410, preliminary light emission from the external flash device is controlled, i.e., the FE lock is updated.

If the flag FEB_COUNT is found at the step 409 to be neither at "0" nor at "1", the flow proceeds to the step 415. In other words, in a case where at least one shot of scene has been taken in the flash bracketing photo-taking mode, the FE lock is inhibited from being updated.

At the step 410, the external flash device is caused to perform preliminary light emission control. Then, the value Δf is computed and obtained from the output of the light measuring circuit 104. Further, information on the amount of the preliminary light emission thus made is obtained by communication with the flash device and is stored as the data "pre_level".

At a step 411, the flag FELK_FLG is set to "1" to indicate an FE lock state.

At the next step 412, a check is made to find if the flag FEB_COUNT is at "1". If so, the flow proceeds to a step 413 to set the flag FELK_FEB to "1". The flow then proceeds from the step 413 to a step 416. If the flag FEB_COUNT is found at the step 412 to be not at "1", i.e., to be at "0", the flow proceeds from the step 412 directly to the step 416.

Further, at the step 414, information relative to the flash device is cleared, because the flash device is not mounted on the camera. The flow then proceeds from the step 414 to the step 415.

At the step 415, a check is made to find if the switch SW1 is in its off-state. If so, the flow proceeds to a step 423, at which photo-taking information is written into the EEPROM 100b of the MPU 100, and the program is terminated. If the switch SW1 is found to be in its on-state, the flow proceeds to the step 416 to make preparations for photo-taking.

At the step 416, a shutter speed and an aperture value of the lens are computed and obtained to decide an amount of exposure on the basis of information on the luminance of the object of shooting obtained from the light measuring circuit 104.

At the next step 417, the focus detecting circuit 103 is caused to perform a focus detecting action by the phase difference detecting method as mentioned in the foregoing.

At a step 418, the MPU 100 controls and causes the lens control circuit 39 to adjust the focus of the photo-taking lens 1 according to a state of focus detected by the focus detecting action performed at the step 417. At a step 419, the MPU 100 communicates with the liquid crystal display circuit 102 to display, within the viewfinder, the shutter speed and the aperture value obtained at the step 416 and the result of focus detection obtained at the step 417.

At a step 420, a check is made for the state of the switch SW2. If the switch SW2 is found to be in its off-state, the flow proceeds to a step 422. If the switch SW2 is found to be in its on-state, the flow proceeds to a step 421 to perform release control for exposing the film to light.

Figure 11:
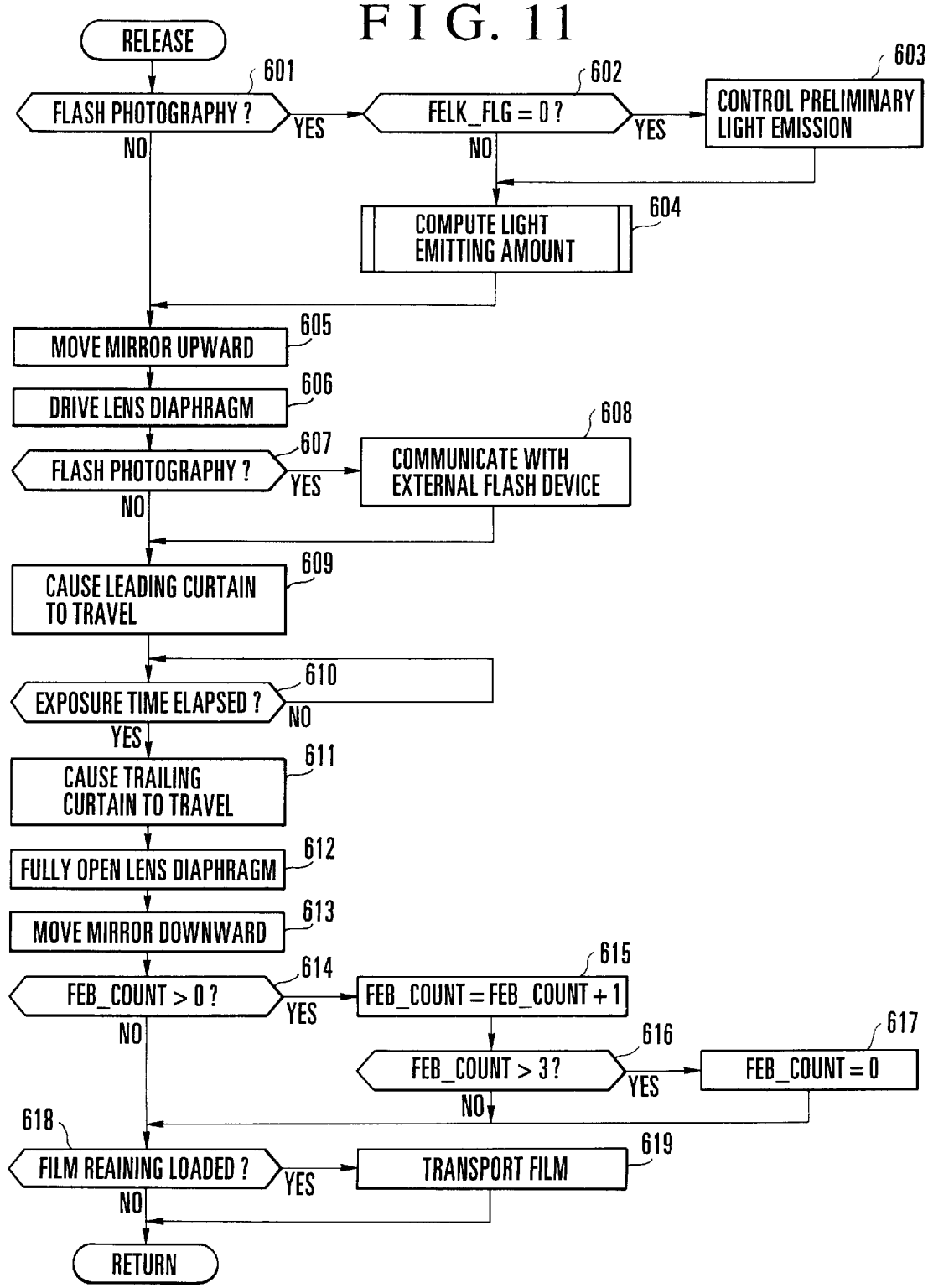
FIG. 11 is a flow chart showing release actions of the camera in the fifth embodiment.

FIG. 11 is a flow chart showing the details of the release control of the step 412 of FIG. 9. The flow of the release control operation is described as follows. At a step 601, a check is made for flash photography. In the case of the fifth embodiment, the flash photo-taking operation is performed when the external flash device is mounted and is in a completely charged state. If a flash photo-taking operation is to be performed, the flow proceeds to a step 602. If not, the flow proceeds to a step 605.

At the step 602, a check is made to find if the flag FELK_FLG is at "0". If so, the flow proceeds to a step 603. If not (if the flag FELK_FLG is at "1"), the flow proceeds to a step 604.

At the step 603, as in the case of the preliminary light emission control in the FE lock state, the external flash device is caused to perform the preliminary light emission control. Then, the value ΔF is computed and obtained from the output of the light measuring circuit 104. Further, information on the amount of the preliminary light emission made by the flash device is received through communication with the flash device and is stored as data PRE_LEVEL.

At the step 604, an amount of main flash light emission is computed. The details of the light emitting amount computing operation are described below with reference to the flow chart of FIG. 12.

Figure 12:
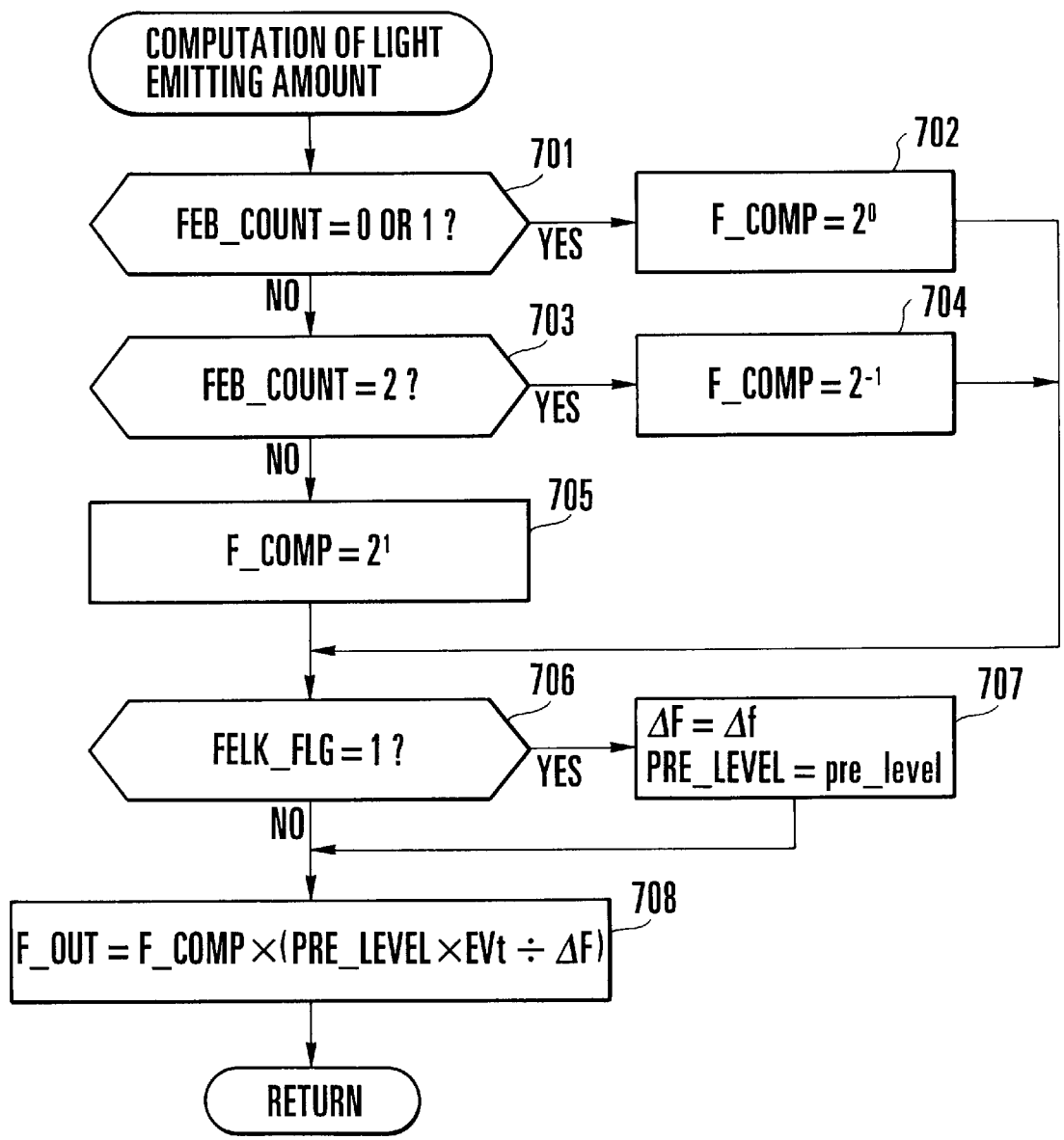
FIG. 12 is a flow chart showing processes for computing an amount of flash light emission to be carried out by the camera in the fifth embodiment.

At a step 701 of FIG. 12, a check is made to find if the flag FEB_COUNT is either at "0" or "1". If so, the flow proceeds to a step 702 to set a light control correcting amount F_COMP to "2⁰". If not, the flow proceeds to a step 703.

At the step 703, a check is made to find if the flag FEB_COUNT is at "2". If so, the flow proceeds to a step 704 to set the flag F_COMP to "2⁻¹". If the flag F_COMP is found to be at a value larger than "2", the flow proceeds to a step 705 to set the flag F_COMP to "2¹". In other words, no light control correction is made in a case where the camera is either not in the flash bracketing photo-taking mode or at the first shot of scene in one sequence of the flash bracketing photo-taking mode. The light control correction is applied by −1 step in the case of a second shot of scene in one sequence of the flash bracketing photo-taking mode and by +1 step in the case of a third shot of scene or a shot subsequent to the third shot in one sequence of the flash bracketing photo-taking mode.

At a step 706, a check is made to find if a flag FELK_FLG is at "1". If so, the flow proceeds to a step 707. At the step 707, the data ΔF and the data PRE_LEVEL which are obtained in the FE lock state are stored, in a data area to be used when the camera is not in the FE lock state, respectively as data Δf and data "pre_level". If the flag FELK_FLG is found at the step 706 to be not at "1", the flow proceeds from the step 706 to a step 708. These steps are arranged to make arithmetic operations applicable both when the camera is in the FE lock state and when the camera is not in the FE lock state.

At the step 708, an amount of main light emission F_OUT of the flash device is computed as follows, before the flow returns to the step 605 of FIG. 11:

$$F\_OUT = F\_COMP \times (PRE\_LEVEL \times EVt \div \Delta F)$$

where
F_COMP: a light control correcting amount
PRE_LEVEL: an amount of preliminary light emission from the flash device
EVt: a target amount of exposure
ΔF: an amount of preliminary light emission impinging on the object of shooting.

In the case of the fifth embodiment, arithmetic operations for obtaining a flash exposure amount and the result of light measurement are performed in APEX values.

Referring again to the flow chart of FIG. 11, at the step 605, the main mirror 2 is moved upward by driving the motor M through the motor control circuit 106.

At the next step 606, information on an aperture value is sent to the lens control circuit 39. In accordance with the information on the aperture value, the aperture of the diaphragm 31 of the photo-taking lens 1 is stopped down to a position corresponding to the value designated.

At a step 607, a check is made to find if flash photography is selected. If so, the flow proceeds to a step 608 to communicate with the external flash device to send information on the amount of flash light emission and a signal for the commencement of flash light emission. If not, the flow proceeds to a step 609. At the step 609, the shutter control circuit 105 is caused to allow the leading curtain of the shutter to travel.

At a step 610, a check is made to find if a set length of exposure time has elapsed. If not, the flow loops around this step to wait for the lapse of the exposure time. If so, the flow proceeds to a step 611. At the step 611, the shutter control circuit 105 is caused to allow the trailing curtain of the shutter to travel.

At a step 612, the MPU 100 communicates with the lens control circuit 39 to have the diaphragm 31 fully opened.

At a step 613, the motor M is caused to be driven through the motor control circuit 106 to move the main mirror 2 down.

At the next step 614, a check is made to find if the value of the flag FEB_COUNT is larger than "0". If so, the flow proceeds to a step 615. If not, the flow proceeds to a step 618.

At the step 615, the count of the shot of scenes taken in the flash bracketing photo-taking mode is incremented by one by performing an arithmetic operation of "FEB_COUNT=FEB_COUNT+1".

At a step 616, a check is made to find if the value of the flag FEB_COUNT is larger than "3". If so, the flow proceeds to a step 617 to set the flag FEB_COUNT in a state of "FEB_COUNT=0". If not, the flow proceeds to a step 618. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 618. At the step 618, a check is made to find if the camera is loaded with the film. If so, the flow proceeds to a step 619. At the step 619, the film is transported to an extent corresponding to one frame portion thereof, and the flow returns to the step 422 of FIG. 9. If the camera is found at the step 618 to be not loaded with any film, the flow returns directly from the step 618 to the step 422 of FIG. 9.

With the control operation on release actions having been finished in the manner described above, the flow returns to the flow of FIG. 9. At the step 422, a check is made to find if the switch SW1 is in its on-state. If so, the flow returns from the step 422 to the step 403. If the switch SW1 is found to be in its off-state, the flow proceeds to a step 423. At the step 423, photo-taking information of varied kinds, such as the flash bracketing information, etc., are stored in the EEPROM 100b, and the program comes to an end.

(Sixth Embodiment)

A camera according to a sixth embodiment of the invention is arranged to make a check for completion of a charging process and to perform flag processing actions in a manner as described below with reference to a flow chart shown in FIG. 13. The sixth embodiment performs control actions in the same manner as the fifth embodiment with the exception of the check for completion of the charging process and the flag processing actions.

Figure 13:
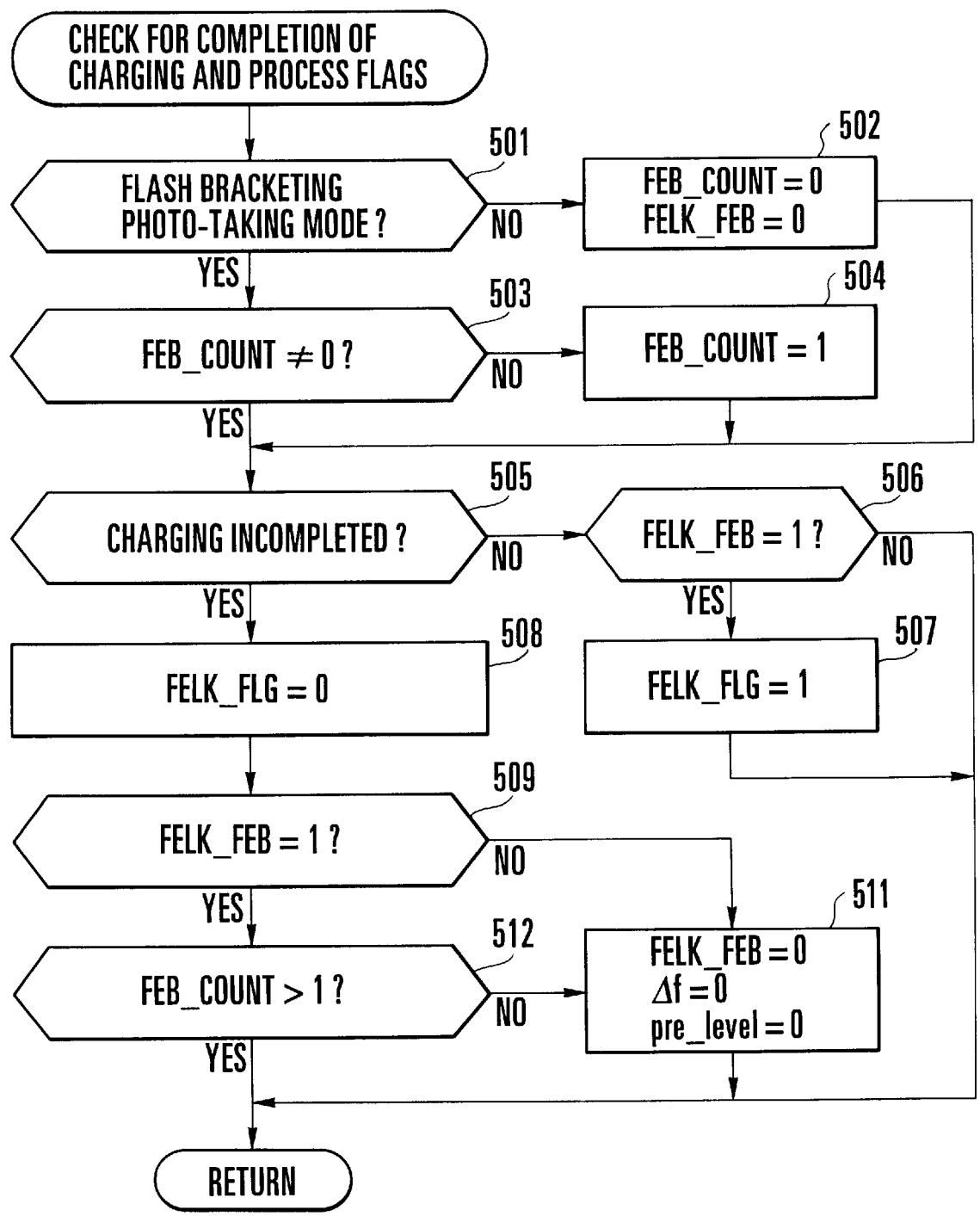
FIG. 13 is a flow chart showing control actions of a camera according to a sixth embodiment of the invention, including a check for completion of charging and a flag processing action.

At a step 501 of FIG. 13, a check is made to find if a flash bracketing photo-taking mode is set. If so, the flow of operation proceeds to a step 503. If not, the flow proceeds to a step 502. At the step 502, a flag FEB_COUNT which indicates a number of the shot of scenes taken in the flash bracketing photo-taking mode and another flag FELK_FEB which indicates whether or not the FE lock is applied in the flash bracketing photo-taking mode (but does not indicate that the camera is in a FE locked state) are cleared. The flow then proceeds from the step 502 to a step 505. After the step 502, the camera can be judged to be not set in the flash bracketing photo-taking mode when the flag FEB_COUNT is at "0".

At the step 503 of FIG. 13, a check is made to find if the flag FEB_COUNT is not at "0". If the flag FEB_COUNT is not at "0", the flow proceeds to the step 505. If the flag FEB_COUNT is at "0", the flow proceeds to a step 504. At the step 504, the flag FEB_COUNT is set to "1" to indicate a first shot of scenes in the flash bracketing photo-taking mode. The flow then proceeds from the step 504 to the step 505.

At the step 505, a check is made for completion of a charging process of the flash device, i.e., to find if the charge voltage of the flash device is lower than a level at which light emission is possible. If the charging process is found to be not completed, the flow proceeds to a step 508. If the charging process is found to be completed, the flow proceeds to a step 506.

At the step 506, a check is made to find if the flag FELK_FEB is at "1" indicating that the FE lock is applied in the flash bracketing photo-taking mode. If so, the flow proceeds to a step 507. If not, the flow returns from the step 506 to the step 407 of FIG. 9.

At the step 507, a flag FELK_FLG which indicates an FE lock state is set to "1" to indicate that the camera is in the FE locked state. The flow then returns from the step 507 to the step 407 of FIG. 9.

At the step 508, the flag FELK_FLG is set to "0", so that the FE lock is canceled.

At a step 509, a check is made to find if the flag FELK_FEB is at "1". If not, the flow proceeds to a step 511. If the flag FELK_FEB is at "1", the flow proceeds to a step 512.

At the step 512, a check is made to find if the value of the flag FEB_COUNT is larger than "1". If the flag FEB_COUNT is found to be at "1", the flow proceeds to the step 511.

At the step 511, the data Δf (an amount of preliminary light emission impinging on the object of shooting) and the data "pre_level" (an amount of preliminary light emission) which are FE lock information are cleared. The flow then returns to the flow of FIG. 9.

If the value of the flag FEB_COUNT is found at the step 512 to be larger than "1", the flow returns to the step 407 of FIG. 9 directly from the step 512.

In other words, in a case where at least one shot of scene has been taken in the flash bracketing photo-taking mode and in the FE lock state, the data Δf and data "pre_level" which are FE lock information to be used in a computing operation for light emission in the state of FE lock can be retained without being cleared, even when the FE lock is canceled because of an insufficient charge voltage of the flash device. After that, when the charge voltage of the flash device is found to be sufficient at the next round of flow, the FE lock state is resumed at the step 507 (FELK_FLG=0) and the FE lock information retained will be used in a computing operation for an amount of light emission to be performed at the step 604 of FIG. 11.

(Seventh Embodiment)

A camera according to a seventh embodiment of the invention is arranged to perform control over release actions in a manner as described below with reference to a flow chart shown in FIG. 14. The seventh embodiment performs control actions in the same manner as the fifth embodiment with the exception of the control over release actions.

Figure 14:
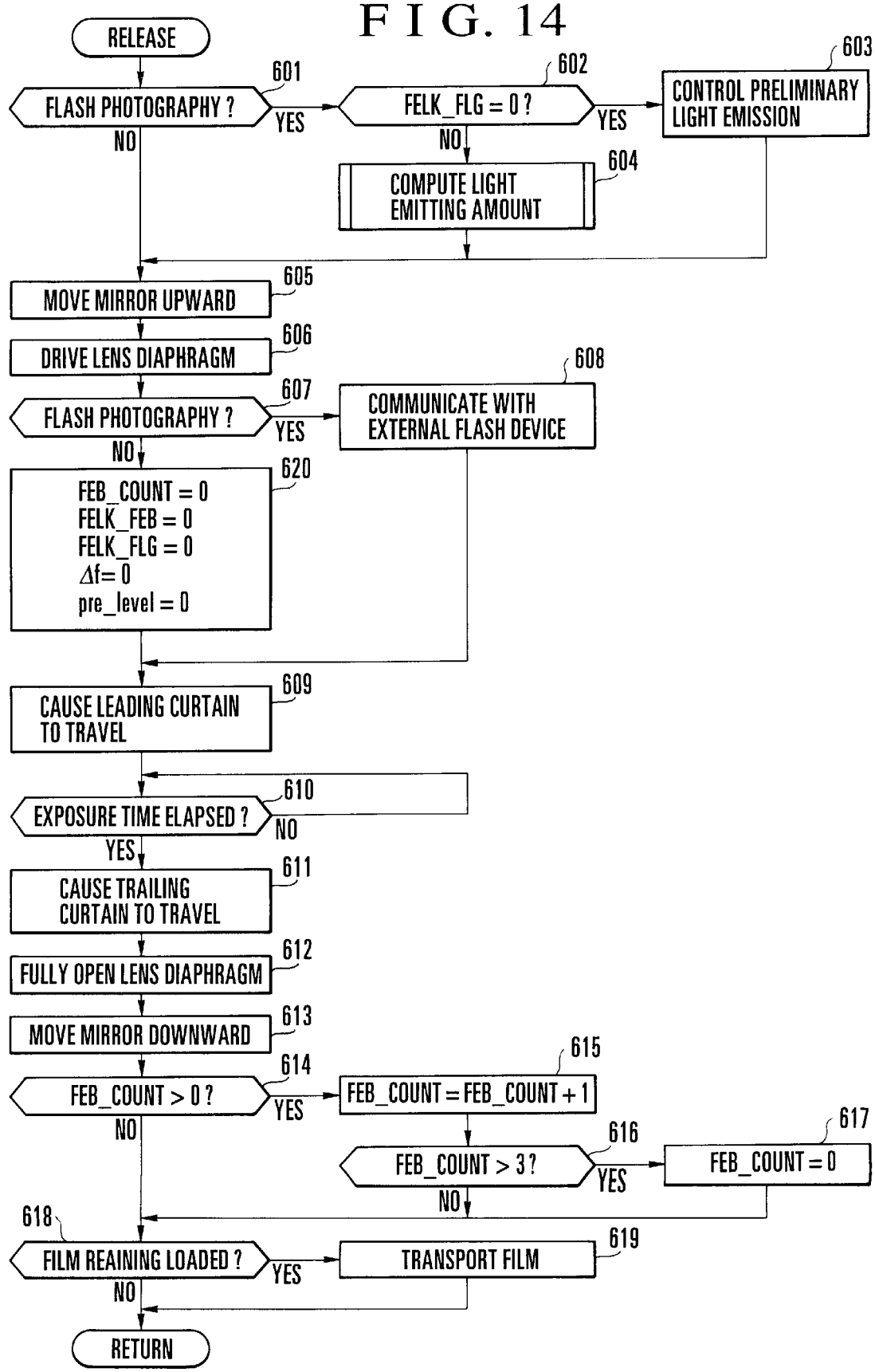
FIG. 14 is a flow chart showing release actions of a camera according to a seventh embodiment of the invention.

At a step 601 of FIG. 14, a check is made for flash photography. In this case, the flash photo-taking operation is performed when the external flash device is mounted and is in a completely charged state. If a flash photo-taking operation is to be performed, the flow proceeds to a step 602. If not, the flow proceeds to a step 605.

At the step 602, a check is made to find if the flag FELK_FLG is at "0". If so, the flow proceeds to a step 603. If not (if the flag is at "1"), the flow proceeds to a step 604.

At the step 603, as in the case of preliminary light emission control in the FE lock state, the external flash device is caused to perform preliminary light emission control. Then, a value ΔF is computed and obtained from the output of the light measuring circuit 104. Further, information on the amount of the preliminary light emission made by the flash device is received through communication with the flash device and is stored as data PRE_LEVEL.

At the step 604, an amount of main flash light emission is computed in such a manner as described in the fifth embodiment with reference to the flow chart of FIG. 12.

At the step 605, the main mirror 2 is moved upward by driving the motor M through the motor control circuit 106.

At the next step 606, information on an aperture value is sent to the lens control circuit 39. In accordance with the information on the aperture value, the aperture of the diaphragm 31 of the photo-taking lens 1 is stopped down to a position corresponding to the value designated.

At a step 607, a check is made to find if flash photography is selected. If so, the flow proceeds to a step 608 to communicate with the external flash device to send information on the amount of flash light emission and a signal for the commencement of flash light emission. If not, the flow proceeds to a step 620.

At the step 620, for photo-taking without flash light, all data of FE lock information and flash bracketing information are cleared.

At the next step 609, the shutter control circuit 105 is caused to allow the leading curtain of the shutter to travel.

At a step 610, a check is made to find if a set length of exposure time has elapsed. If not, the flow loops around this step to wait for the lapse of the exposure time. If so, the flow proceeds to a step 611. At the step 611, the shutter control circuit 105 is caused to allow the trailing curtain of the shutter to travel.

At a step 612, the MPU 100 communicates with the lens control circuit 39 to have the diaphragm 31 fully opened.

At a step 613, the motor M is caused to be driven through the motor control circuit 106 to move the main mirror 2 down.

At the next step 614, a check is made to find if the value of the flag FEB_COUNT is larger than "0". If so, the flow proceeds to a step 615. If not, the flow proceeds to a step 618.

At the step 615, the count of the shot of scenes taken in the flash bracketing photo-taking mode is incremented by one by performing an arithmetic operation of "FEB_COUNT=FEB_COUNT+1".

At a step 616, a check is made to find if the value of the flag FEB_COUNT is larger than "3". If so, the flow proceeds to a step 617 to set the flag FEB_COUNT to a state of "FEB_COUNT=0". If not, the flow proceeds to the step 618. In other words, the count values of the flag FEB_COUNT are limited to a range from 0 to 3 to have one sequence of flash bracketing consist of three shots.

With an exposure of one frame of the film having finished in the above-stated manner, the flow proceeds to the step 618. At the step 618, a check is made to find if the camera is loaded with the film. If so, the flow proceeds to a step 619. At the step 619, the film is transported to an extent corresponding to one frame portion thereof, and the flow returns to the step 422 of FIG. 9. If the camera is found at the step 618 to be not loaded with any film, the flow returns from the step 618 directly to the step 422 of FIG. 9.

According to the arrangement of each of the fifth to seventh embodiments described above, when the FE lock is applied in the flash bracketing photo-taking mode, the information related to the FE lock (information on the amount of main light emission, etc.) is retained without being cleared, even if the charge voltage of the flash device becomes lower than a light emission enabling voltage. This arrangement effectively prevents the FE lock in the flash bracketing photo-taking mode from being canceled by a drop of the charge voltage of the flash device. Therefore, upon recovery of the charge voltage of the flash device after that, a photo-taking operation in the flash bracketing photo-taking mode can be carried on in the same FE lock state as a shot of scene last taken by flash bracketing.

Further, if the information related to the FE lock and flash bracketing is made to be cleared in a case where a shot has been taken without using the flash device (particularly, after at least one shot of scene has been taken using the flash device) with the FE lock applied in the flash bracketing photo-taking mode, the flash bracketing photo-taking operation can be prevented from being continued with a non-flash photo-taking shot commingled with flash photo-taking shots. Such an arrangement effectively prevents the continuity of the flash bracketing photo-taking operation from becoming unable to be retained.

Each of the fifth, sixth and seventh embodiments of the invention is arranged to inhibit the FE lock from being updated when the FE lock has been performed in the flash bracketing photo-taking mode and at least one shot of scene has been taken by flash photography. The arrangement effectively prevents the continuity of the flash bracketing photo-taking operation from becoming unable to be retained if the FE lock information varies during one sequence of a flash bracketing photo-taking operation.

I claim:

1. A camera capable of performing a photo-taking operation in a flash bracketing photo-taking mode in which an amount of light emission by a flash device is increased or decreased by a desired amount with respect to a predetermined value for every shot to be taken using the flash device, said camera comprising:

control means for inhibiting a predetermined photo-taking operation in the flash bracketing photo-taking mode if a charge voltage of the flash device is lower than a light emission enabling voltage when said camera is set in the flash bracketing photo-taking mode.

2. A camera according to claim 1, wherein said control means includes means for inhibiting a photo-taking operation if the charge voltage of the flash device is lower than the light emission enabling voltage after at least one shot of scene has already been taken in the flash bracketing photo-taking mode.

3. A camera according to claim 2, wherein said control means includes means for allowing one shot of scene to be taken even if the charge voltage of the flash device is lower than the light emission enabling voltage when said camera is set in the flash bracketing photo-taking mode.

4. A camera according to claim 1, wherein said control means includes means for allowing a photo-taking operation without using the flash device to be performed if the charge voltage of the flash device is lower than the light emission enabling voltage when said camera is not set in the flash bracketing photo-taking mode.

5. A camera according to claim 4, wherein said control means includes means for allowing a photo-taking operation without using the flash device to be performed if the charge voltage of the flash device is lower than the light emission enabling voltage when said camera is set in a flash photo-taking mode other than the flash bracketing photo-taking mode.

6. A camera according to claim 2, wherein said camera is capable of setting a continuous photo-taking mode in which a continuous photo-taking operation is performed in response to a continuous release operation, and said control means includes means for inhibiting a photo-taking operation if the charge voltage of the flash device is lower than the light emission enabling voltage while the continuous release operation is continuously being performed after at least one shot of scene is taken with the flash device used in response to the continuous release operation during the flash bracketing photo-taking mode.

7. A camera according to claim 6, wherein said control means includes means for allowing a photo-taking operation without using the flash device to be performed if the charge voltage of the flash device is lower than the light emission enabling voltage when the continuous release operation is canceled after the photo-taking operation is inhibited.

8. A camera according to claim 6, wherein said camera is further capable of selectively setting one of a single photo-taking mode in which a photo-taking operation is terminated every time one shot of scene is taken and the continuous photo-taking mode, and said control means includes means for allowing a photo-taking operation without using the flash device to be performed if the charge voltage of the flash device is lower than the light emission enabling voltage when the single photo-taking mode is set during the flash bracketing photo-taking mode.

9. A camera capable of performing an FE lock function of setting an amount of light emission of a flash device for a photo-taking operation by making preliminary light emission from the flash device prior to the photo-taking operation, and capable of setting a flash bracketing photo-taking mode in which an amount of light emission by the flash device is increased or decreased by a desired amount with respect to a predetermined value for every shot to be taken using the flash device, said camera comprising:

clearing means for clearing information related to the FE lock function if a charge voltage of the flash device is lower than a light emission enabling voltage; and control means for, when the FE lock function has been performed during the flash bracketing photo-taking mode, preventing said clearing means from performing said clearing so as to retain the information related to the FE lock function even if the charge voltage of the flash device is lower than the light emission enabling voltage.

10. A camera according to claim 9, wherein said control means includes means for, when the FE lock function has been performed without setting the flash bracketing photo-taking mode, allowing said clearing means to clear the information related to the FE lock function if the charge voltage of the flash device is lower than the light emission enabling voltage.

11. A camera according to claim 9, wherein said control means includes means for, when the FE lock function has been performed during the flash bracketing photo-taking mode, retaining the information related to the FE lock function if the charge voltage of the flash device is lower than the light emission enabling voltage, and for, when, after that, the charge voltage of the flash device has become higher than the light emission enabling voltage, continuing the flash bracketing photo-taking mode on the basis of the retained information related to the FE lock function.

12. A camera according to claim 9, wherein said control means includes means for, when the FE lock function has been performed during the flash bracketing photo-taking mode, causing a photo-taking operation without using the flash device to be performed, if a release operation is performed while the charge voltage of the flash device is lower than the light emission enabling voltage.

13. A camera according to claim 12, wherein said control means includes means for, when the FE lock function has been performed during the flash bracketing photo-taking mode, clearing information related to the FE lock function and information related to the flash bracketing photo-taking mode, if a photo-taking operation without using the flash device has been performed.

14. A camera capable of performing an FE lock function of setting an amount of light emission of a flash device for a photo-taking operation by making preliminary light emission from the flash device prior to the photo-taking operation, and capable of setting a flash bracketing photo-taking mode in which an amount of light emission by the flash device is increased or decreased by a desired amount with respect to a predetermined value for every shot to be taken using the flash device, said camera comprising:

clearing means for clearing information related to the FE lock function if a charge voltage of the flash device is lower than a light emission enabling voltage; and control means for, when the FE lock function has been performed during the flash bracketing photo-taking mode and at least one shot of scene has been taken using the flash device, preventing said clearing means from performing said clearing so as to retain the information related to the FE lock function even if the charge voltage of the flash device is lower than the light emission enabling voltage.

15. A camera according to claim 14, wherein said control means includes means for, when the FE lock function has been performed without setting the flash bracketing photo-taking mode, allowing said clearing means to clear the information related to the FE lock function if the charge voltage of the flash device is lower than the light emission enabling voltage.

16. A camera according to claim 14, wherein said control means includes means for, when the FE lock function has been performed during the flash bracketing photo-taking mode and at least one shot of scene has been taken using the flash device, retaining the information related to the FE lock function if the charge voltage of the flash device is lower than the light emission enabling voltage, and for, when, after that, the charge voltage of the flash device has become higher than the light emission enabling voltage, continuing the flash bracketing photo-taking mode for photo-taking a subsequent shot of scene on the basis of the retained information related to the FE lock function.

17. A camera according to claim 14, wherein said control means includes means for, when the FE lock function has been performed during the flash bracketing photo-taking mode, causing a photo-taking operation without using the flash device to be performed, if a release operation is performed while the charge voltage of the flash device is lower than the light emission enabling voltage.

18. A camera according to claim 17, wherein said control means includes means for, when the FE lock function has been performed during the flash bracketing photo-taking mode, clearing information related to the FE lock function and information related to the flash bracketing photo-taking mode, if a photo-taking operation without using the flash device has been performed after at least one shot of scene has been taken using the flash device.

19. A camera capable of performing an FE lock function of setting an amount of light emission of a flash device for a photo-taking operation by making preliminary light emission from the flash device prior to the photo-taking operation, and capable of setting a flash bracketing photo-taking mode in which an amount of light emission by the flash device is increased or decreased by a desired amount with respect to a predetermined value for every shot to be taken using the flash device, said camera comprising:

control means for, when the FE lock function has been performed during the flash bracketing photo-taking mode, inhibiting the FE lock function from being updated if at least one shot of scene has been taken using the flash device.

* * * * *

UNITED STATES PATENT AND TRADEMARK OFFICE
CERTIFICATE OF CORRECTION

PATENT NO. : 6,047,137
DATED : April 4, 2000
INVENTOR(S) : Yuji Yamamoto

It is certified that error appears in the above-identified patent and that said Letters Patent is hereby corrected as shown below:

Column 9,
Line 55, delete "sate" and insert -- state --.

Column 12,
Line 15, delete "13" and insert -- - --.

Column 14,
Line 28, delete "without-passing" and insert -- without passing --.

Signed and Sealed this

Twenty-eighth Day of August, 2001

*Attest:*

NICHOLAS P. GODICI
*Attesting Officer*     *Acting Director of the United States Patent and Trademark Office*